(12) United States Patent
Peterson et al.

(10) Patent No.: US 7,350,931 B1
(45) Date of Patent: Apr. 1, 2008

(54) VEHICULAR PIVOT MIRROR

(75) Inventors: Kenneth C. Peterson, Comstock Park, MI (US); Ian Boddy, Ada, MI (US); Keith D. Foote, Kentwood, MI (US)

(73) Assignee: Magna Donnelly Mirrors North America LLC, Kentwood, MI (US)

( * ) Notice: Subject to any disclaimer, the term of this patent is extended or adjusted under 35 U.S.C. 154(b) by 0 days.

(21) Appl. No.: 11/162,013

(22) Filed: Aug. 25, 2005

Related U.S. Application Data

(63) Continuation of application No. 11/160,615, filed on Jun. 30, 2005.

(60) Provisional application No. 60/522,175, filed on Aug. 25, 2004, provisional application No. 60/521,763, filed on Jun. 30, 2004.

(51) Int. Cl.
*G02B 5/08* (2006.01)
*G02B 7/182* (2006.01)
*B60R 1/06* (2006.01)

(52) U.S. Cl. ............. 359/841; 359/872; 359/873; 359/877

(58) Field of Classification Search ............ 359/841, 359/872, 873, 877
See application file for complete search history.

(56) References Cited

U.S. PATENT DOCUMENTS

| | | | |
|---|---|---|---|
| 2,856,816 A | 10/1958 | Ross | |
| 2,903,210 A | 9/1959 | Cousins | |
| 3,189,309 A | 6/1965 | Hager | |
| 3,282,549 A | 11/1966 | Crawford | |
| 3,667,718 A | 6/1972 | Goslin et al. | |
| 4,165,156 A | 8/1979 | O'Connell | |
| 4,258,894 A | 3/1981 | Niggemann | |
| 4,315,614 A | 2/1982 | Stegenga et al. | |
| 4,558,930 A | 12/1985 | Deedreek | |
| 4,598,982 A | 7/1986 | Levine | |
| 4,605,289 A | 8/1986 | Levine et al. | |
| 4,623,115 A * | 11/1986 | Brester | 248/479 |
| 4,711,538 A | 12/1987 | Ohs et al. | |
| 4,728,181 A * | 3/1988 | Kakinuma | 248/549 |
| 4,753,410 A | 6/1988 | Dyer | |
| 4,789,232 A * | 12/1988 | Urbanek | 248/549 |
| 4,892,400 A | 1/1990 | Brookes et al. | |
| 4,892,401 A | 1/1990 | Kittridge et al. | |
| 4,921,337 A | 5/1990 | Hou | |
| 5,007,724 A | 4/1991 | Hou | |
| 5,096,283 A | 3/1992 | Croteau | |
| 5,110,196 A | 5/1992 | Lang et al. | |
| 5,124,847 A | 6/1992 | Gong | |
| 5,210,655 A | 5/1993 | Mishali | |
| 5,225,943 A | 7/1993 | Lupo | |
| 5,337,190 A | 8/1994 | Kogita et al. | |
| 5,375,014 A * | 12/1994 | Fujie et al. | 359/841 |
| 5,383,057 A * | 1/1995 | Kimura et al. | 359/841 |
| 5,477,392 A * | 12/1995 | Mochizuki et al. | 359/841 |
| 5,546,239 A | 8/1996 | Lewis | |
| 5,604,644 A | 2/1997 | Lang et al. | |

(Continued)

*Primary Examiner*—Ricky D. Shafer
(74) *Attorney, Agent, or Firm*—McGarry Bair PC

(57) ABSTRACT

A vehicular pivot mirror assembly comprises a reflective element assembly pivotably attached to a support arm to enable rotation of the reflective element assembly relative to the support arm about a pivot connection. A positioning assembly enables rotation of the reflective element assembly in response to a rotational force applied to the reflective element assembly and prevents rotation of the reflective element assembly when the rotational force is removed.

12 Claims, 27 Drawing Sheets

U.S. PATENT DOCUMENTS

| | | |
|---|---|---|
| 5,969,890 A | 10/1999 | Whitehead |
| 6,024,459 A | 2/2000 | Lewis |
| 6,213,609 B1 * | 4/2001 | Foote et al. ................ 359/841 |
| 6,361,179 B1 * | 3/2002 | Miyabukuro ................ 359/879 |
| 6,505,944 B1 | 1/2003 | Lewis |
| 6,648,481 B2 | 11/2003 | Lewis |
| 6,672,726 B1 * | 1/2004 | Boddy et al. ................ 359/841 |
| 6,820,987 B1 | 11/2004 | Lewis |
| 6,926,431 B1 * | 8/2005 | Foote et al. ................ 362/494 |
| 7,070,287 B2 * | 7/2006 | Foote et al. ................ 359/841 |
| 2004/0165295 A1 | 8/2004 | Lewis |
| 2005/0030652 A1 | 2/2005 | Lewis |

* cited by examiner

VEHICULAR PIVOT MIRROR

CROSS-REFERENCE TO RELATED APPLICATIONS

This application is a continuation-in-part of U.S. patent application Ser. No. 11/160,615, filed Jun. 30, 2005, which claims the benefit of U.S. provisional application Ser. No. 60/521,763, filed Jun. 30, 2004, and U.S. provisional application Ser. No. 60/522,175, filed Aug. 25, 2004, which are incorporated herein in their entirety.

FIELD OF THE INVENTION

The invention relates generally to rearview mirrors for motor vehicles and more particularly to a vehicular rearview mirror which can be pivoted from a horizontal inboard position to a vertical outboard position.

DESCRIPTION OF THE RELATED ART

External rearview mirrors are ubiquitous for conventional motor vehicles. Such mirrors are frequently adapted to be adjusted by the vehicle operator at preselected positions. For example, external rearview mirrors can be selectively folded against the vehicle when not in use, and folded away from the vehicle for use, or extended laterally away from the vehicle (the "outboard" position) to adjust the rearward view during towing of a trailer, and retracted toward the vehicle (the "inboard" position) during non-towing operation. Mirrors can also be extended and retracted between the inboard and outboard positions by rotating the mirror about an axis which is offset from the center point of the reflective element and perpendicular thereto. Examples of prior art rotatable mirrors include U.S. Pat. Nos. 5,546,239, 6,024,459, 6,505,944, and 6,648,481 to Lewis.

SUMMARY OF THE INVENTION

A vehicular mirror assembly comprises a reflective element assembly, a support arm for supporting the reflective element assembly, a pivot connection connecting the reflective element assembly to the support arm and enabling the reflective element assembly to be rotated between a first position and a second position relative to the support arm, the pivot connection including a retainer which prevents axial movement of the reflective element assembly relative to the support arm, and a clutch assembly interposed between the reflective element assembly and the support arm for maintaining the reflective element assembly in one of the first position and the second position and permitting rotation of the reflective element assembly relative to the support arm between the first and second positions.

The pivot connection can comprise a pair of juxtaposed bearing sleeves associated with a respective one of the support arm and the reflective element assembly. The pair of juxtaposed bearing sleeves is made from a low-friction material.

The retainer can comprise a press-fit ring received on one of the support arm and the reflective element assembly and encapsulating the pair of juxtaposed bearing sleeves between the retainer and the other of the support arm and the reflective element assembly.

In one embodiment, the clutch assembly comprises a detent offset from an axis of rotation of the reflective element assembly relative to the support arm on one of the reflective element assembly and the support arm and a biased member in register with the detent on the other of the reflective element assembly and the support arm, wherein the biased member is received by the detent when the support arm is located in one of the first and second positions. The support arm can further comprise a stop in register with the other of the first and second positions, wherein the stop defines an end-of-travel position for the reflective element assembly with respect to the support arm. The biased member can comprise a ball biased into the detent by a spring.

In another embodiment, the clutch assembly comprises a pinion associated with one of the reflective element assembly and the support arm and a rack associated with the other of the reflective element assembly and the support arm, wherein the pinion engages the rack during pivoting of the reflective element assembly between the first and second positions. The pinion can comprise a shaft mounted to the pinion and a shaft retainer mounted to the one of the reflective element assembly and the support arm, wherein the shaft retainer axially receives the pinion shaft and is adapted to prevent rotation of the pinion shaft with respect to the shaft retainer until a preselected level of friction between the pinion shaft and the shaft retainer is overcome, whereby the preselected friction level prevents unintended rotation of the reflective element assembly with respect to the support arm. The shaft retainer can further comprise a plurality of radially spaced fingers which axially receive the pinion shaft and a spring encircling the plurality of fingers to apply the desired friction level to the pinion shaft when the pinion shaft is received within the plurality of fingers.

In yet another embodiment, the clutch assembly comprises a threaded shaft associated with one of the reflective element assembly and the support arm and a follower nut received on the threaded shaft and associated with the other of the reflective element assembly and the support arm, wherein linear movement of the follower nut along the threaded shaft is translated into pivotal movement of the reflective element assembly with respect to the support arm. A motive-producing element can be connected to the threaded shaft for introducing rotation to the threaded shaft, and causing the nut follower to travel along the threaded shaft. The clutch assembly can further comprise a slip clutch located between the threaded shaft and the motive-producing element.

BRIEF DESCRIPTION OF THE DRAWINGS

FIG. 27 is a partially exploded view of an alternate configuration of the assembled portion of the vehicular pivot mirror assembly illustrated in FIG. 24.

DESCRIPTION OF AN EMBODIMENT OF THE INVENTION

Figure 1:
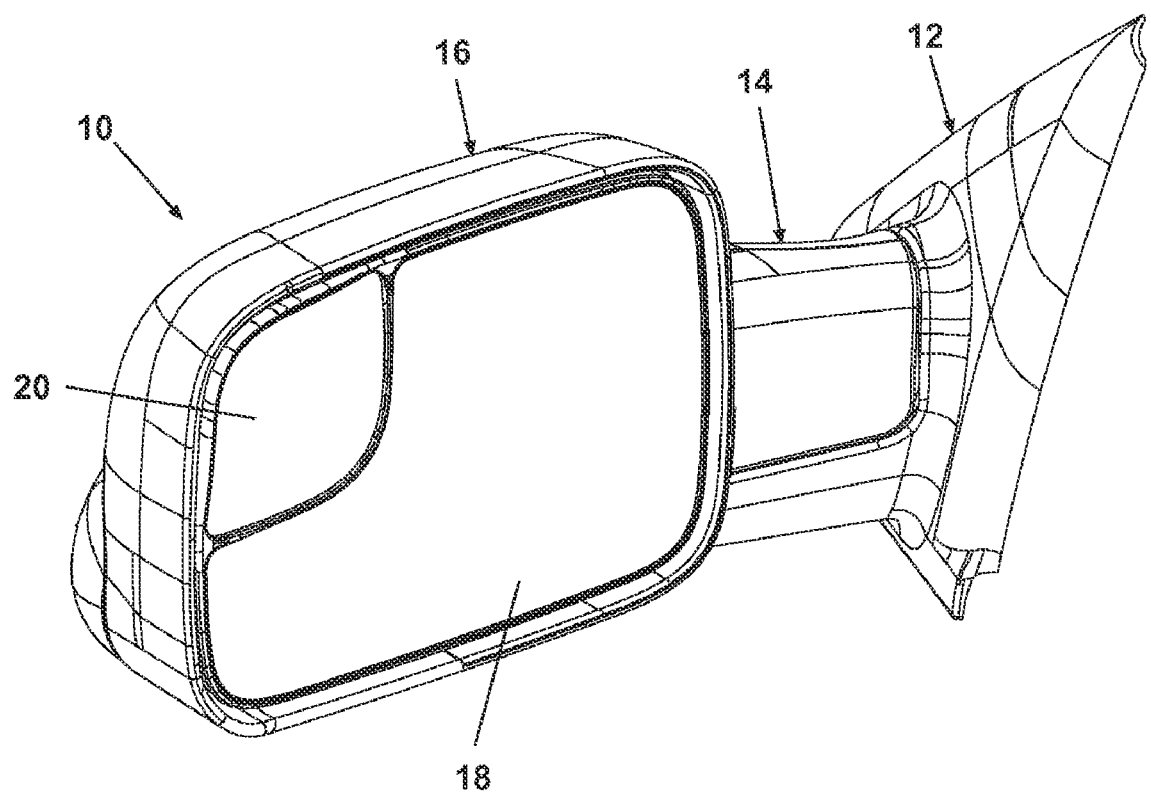
FIG. 1 is a first perspective view of a vehicular pivot mirror assembly according to the invention in a first, inboard position.
Figure 2:
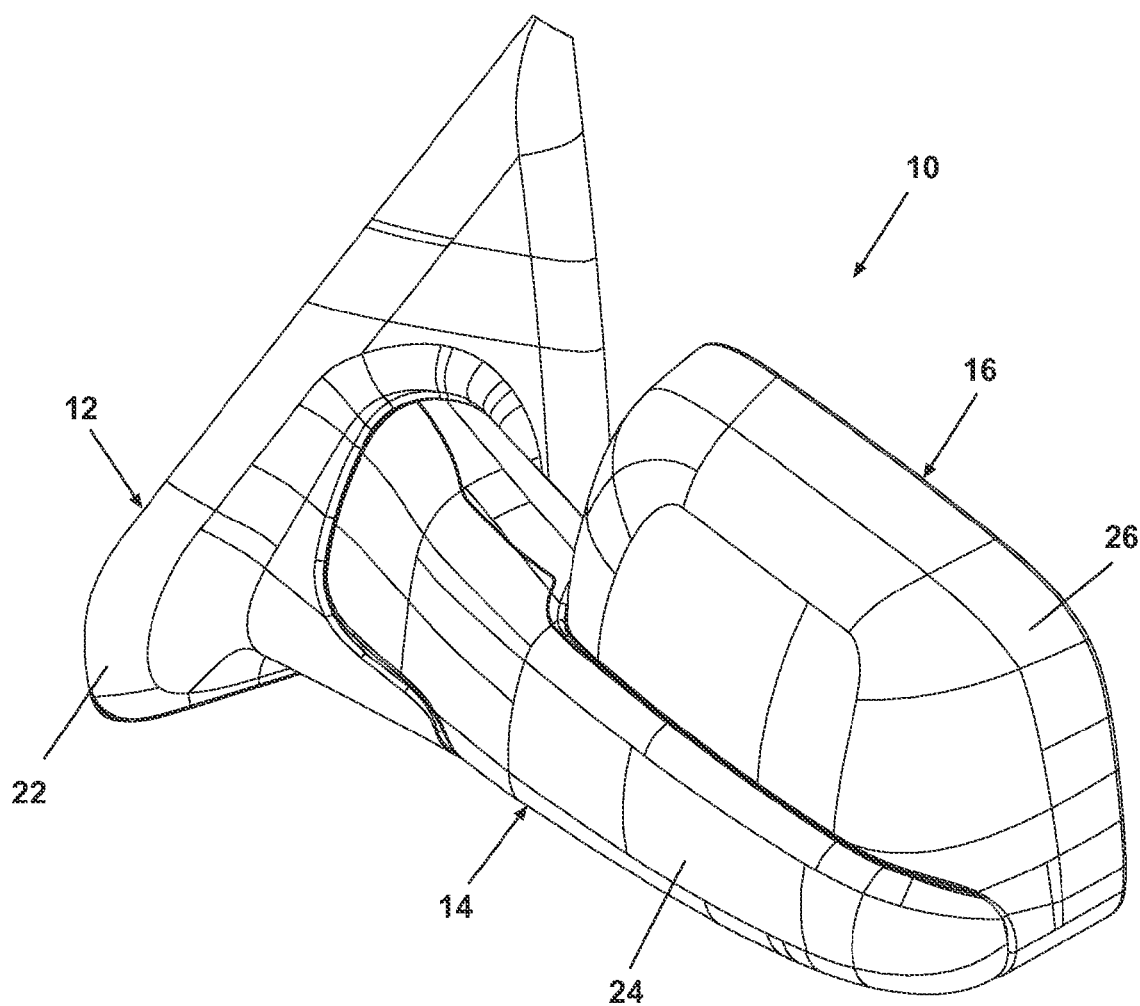
FIG. 2 is a second perspective view of the vehicular pivot mirror assembly illustrated in FIG. 1.

Referring now to the Figures, and in particular to FIGS. 1 and 2, a first embodiment of an external vehicular pivot mirror assembly 10 according to the invention is illustrated comprising a somewhat triangular-shaped base 12, and an elongated, somewhat irregularly shaped support arm 14, and a generally polyhedral reflective element assembly 16. The base 12 is adapted for attachment to a motor vehicle in a well-known manner. The reflective element assembly 16 encloses a primary reflective element 18, and may also enclose a secondary reflective element 20 such as a convex blind zone mirror. The base 12 comprises a base cover 22 enclosing a base frame (not shown). The support arm 14 comprises a support arm cover 24, and the reflective element assembly 16 comprises a reflective element assembly cover 26.

The vehicular pivot mirror assembly 10 can also be provided with enhanced functionality, such as an automatic dimming reflective element, a reflective element defogging/defrosting element, turn indicators, area lights, powered extension, power folding, and the like.

Figure 3:
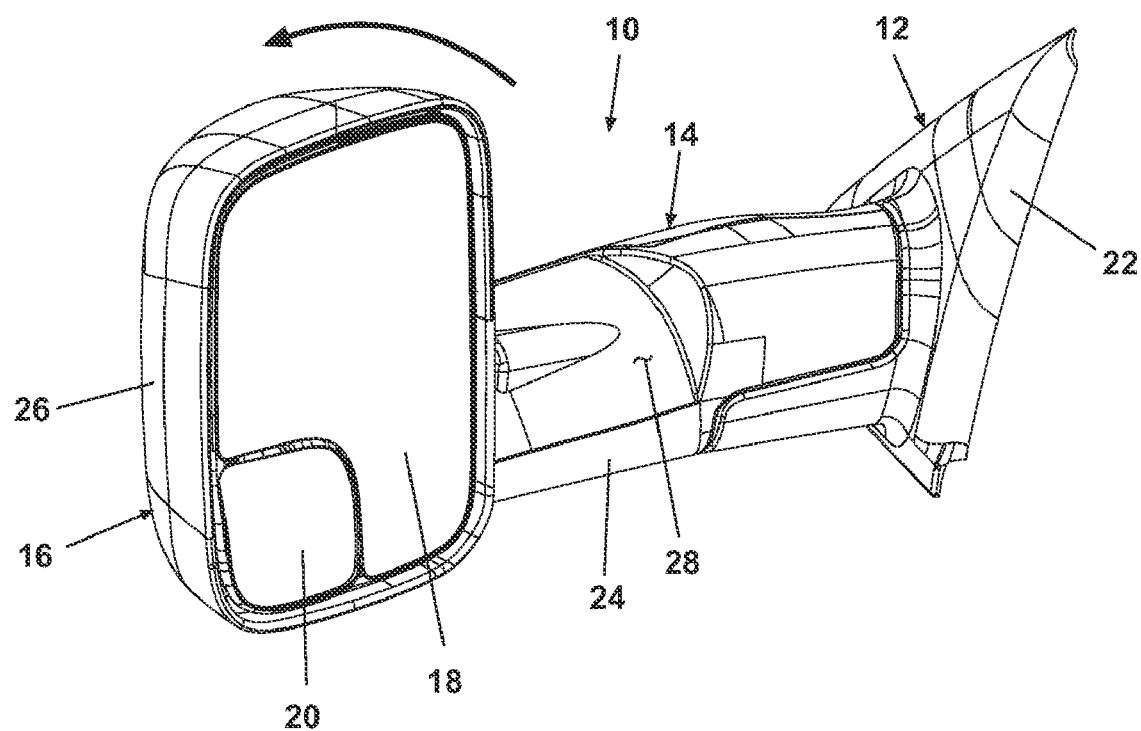
FIG. 3 is a first perspective view of the vehicular pivot mirror assembly illustrated in FIG. 1 in a second, outboard position.
Figure 4:
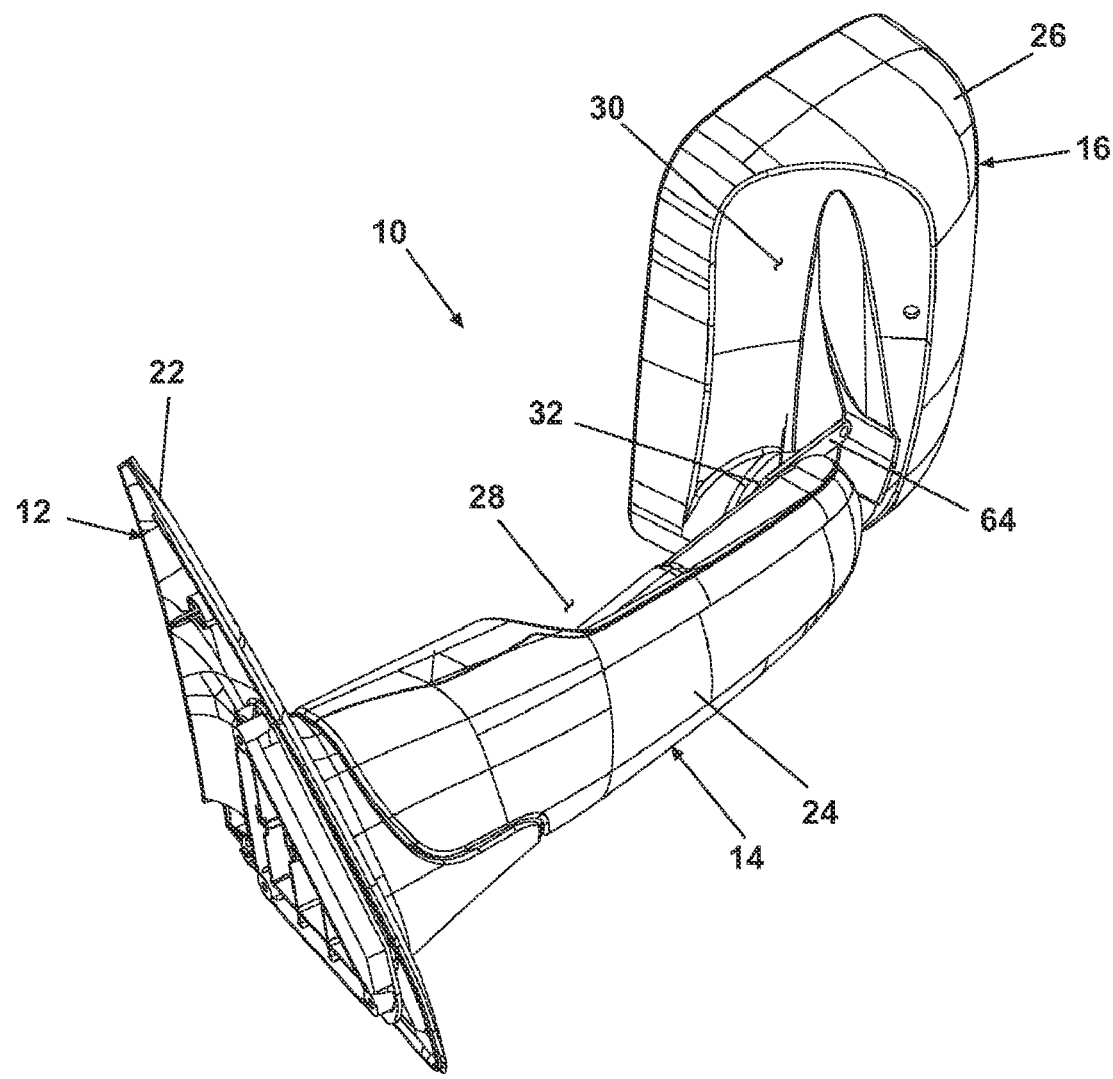
FIG. 4 is a second perspective view of the vehicular pivot mirror assembly illustrated in FIG. 3.

The pivot mirror assembly 10 can be pivoted between a first, inboard position shown in FIGS. 1 and 2, and a second, outboard position shown in FIGS. 3 and 4.

Figure 5:
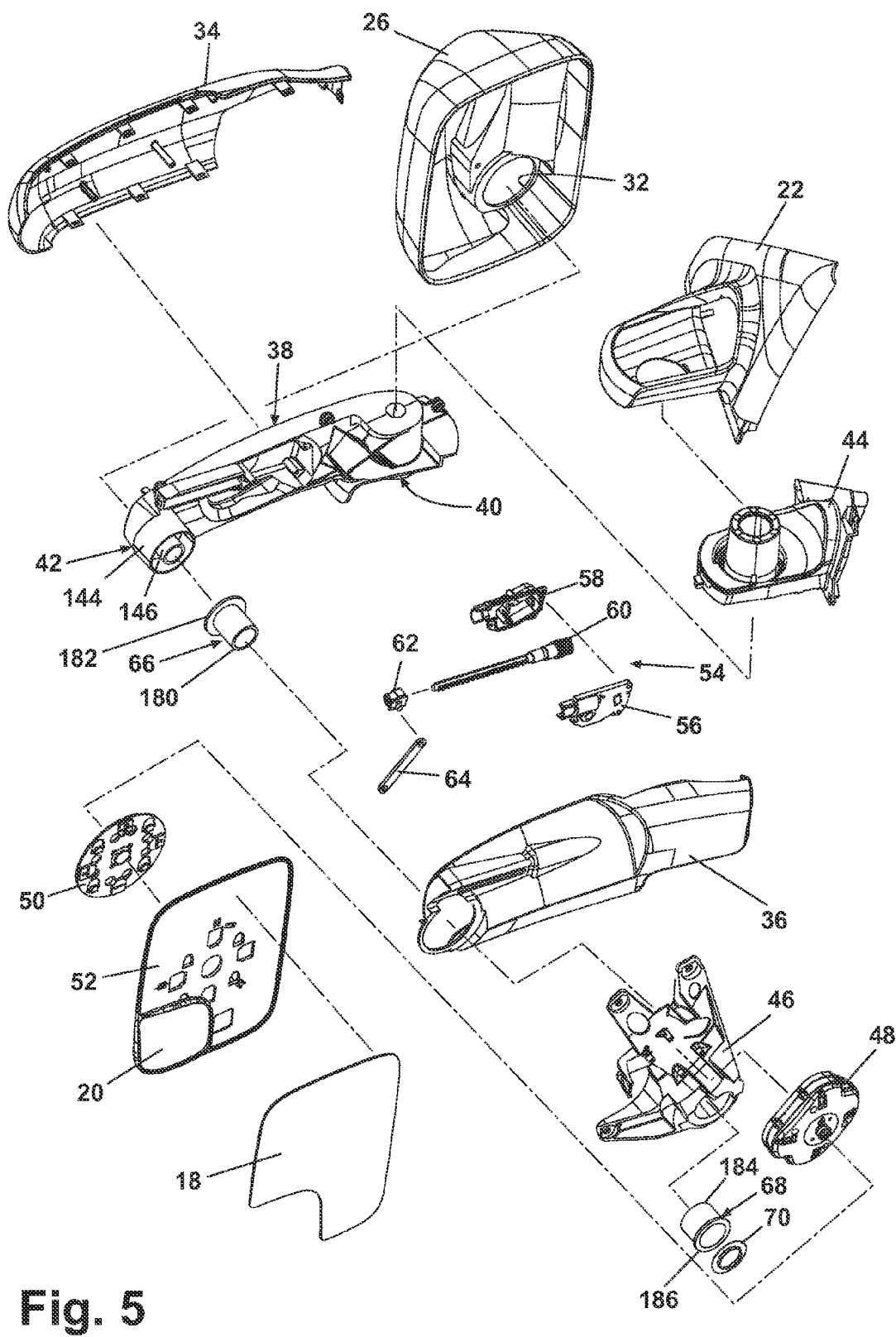
FIG. 5 is an exploded view of the vehicular pivot mirror assembly illustrated in FIG. 1 showing a first embodiment thereof.

Referring now to FIG. 5, the support arm 14 comprises a support arm frame 38, which is enclosed within the support arm cover 24 comprising a front support arm shell 34 and a rear support arm shell 36. The base 12 comprises a base frame 44 enclosed within the base cover 22. The reflective element assembly 16 comprises the reflective elements 18, 20 supported by a generally conventional glass case 52, attached to a tilt actuator plate 50 and a tilt actuator assembly 48 for adjusting the tilt of the reflective elements 18, 20 in a well-known manner. The tilt actuator assembly 48 is attached to a pivot frame 46 which is, in turn, attached to the reflective element assembly cover 26. A positioning assembly as hereinafter described comprises a pivot actuator assembly 54 mounted to the support arm frame 38 and attached to the pivot frame 46 for pivotal movement of the reflective element assembly 16 relative to the support arm 14.

Figure 6A:
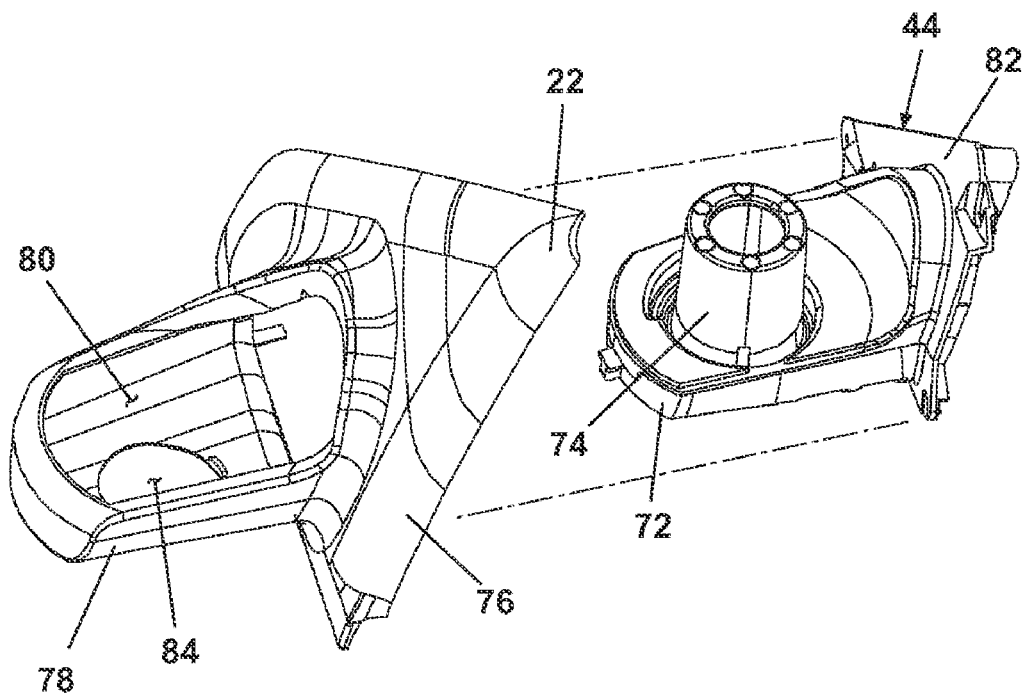
FIGS. 6A-B are exploded views of a base assembly comprising a portion of the vehicular pivot mirror assembly illustrated in FIG. 5.
Figure 6B:
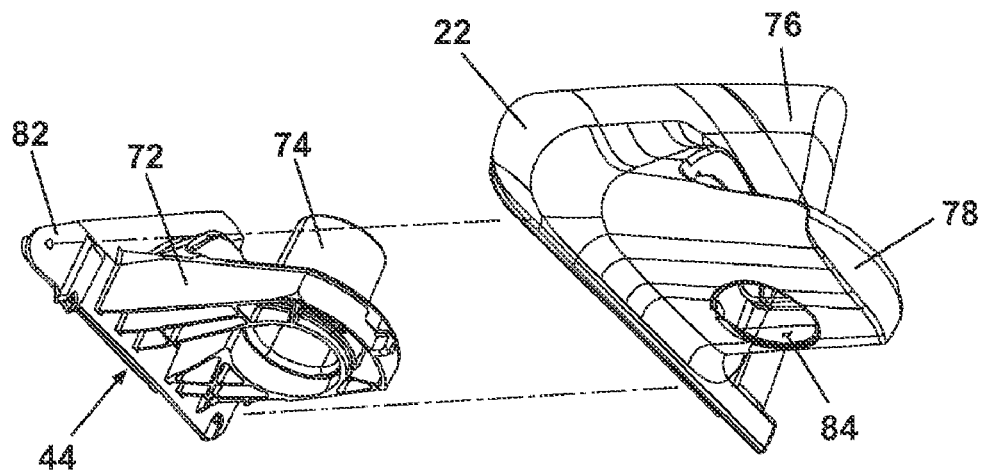

FIGS. 6A-B illustrated the base frame 44 and the base cover 22. The base frame 44 is an irregularly-shaped body having a generally well-known configuration comprising a base plate 82, from which a cantilever arm 72 extends laterally to terminate in a mirror fold pedestal assembly 74. The base plate 82 is adapted for attachment to a side portion of the vehicle in a generally well-known manner, and is shown having a generally triangular shape for purposes of illustration. The mirror fold pedestal assembly 74 is adapted for pivotal attachment of the support arm 14 in a generally well-known manner, which can comprise either a manual or power fold functionality.

The base cover 22 is adapted to fit over the base frame 44 in conformity therewith, and comprises a base plate shell 76, a cantilever arm shell 78 defining therein a cantilever arm cavity 80, and having an access opening 84 therethrough for facilitating the attachment of the support arm 14 to the mirror fold pedestal assembly 74.

Figure 7A:
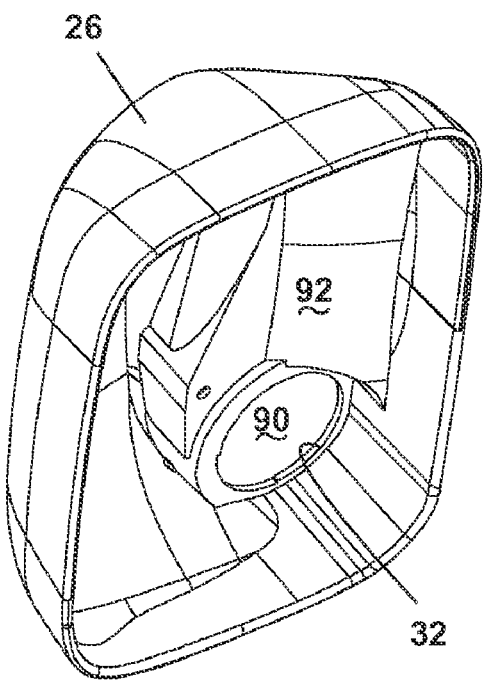
FIGS. 7A-B are perspective views of a reflective element assembly cover comprising a portion of the vehicular pivot mirror assembly illustrated in FIG. 5.
Figure 7B:
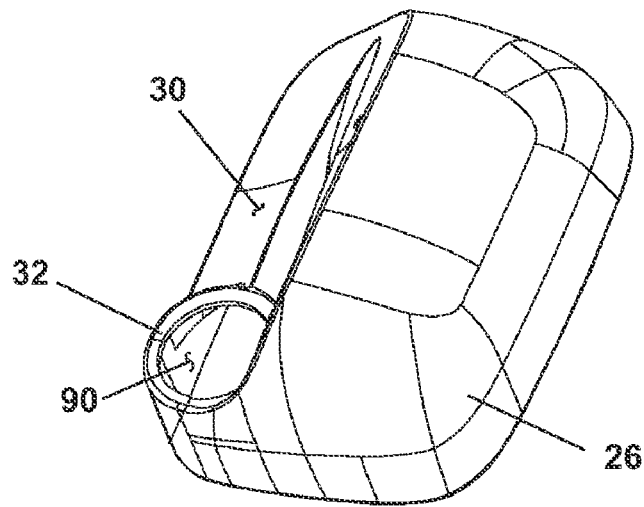

As shown in FIGS. 7A-B, the reflective element assembly cover 26 is a somewhat polyhedral-shaped, shell-like member defining a reflective element assembly cavity 92 therein. The reflective element assembly cover 26 is adapted to enclose the reflective elements 18, 20, the glass case 52, the tilt actuator plate 50, the tilt actuator assembly 48, and the pivot frame 46. An elongated recess 30 is formed in the reflective element assembly cover 26 and adapted for complementary register with the support arm 14. The recess 30 terminates at one end in a circular pivot housing 32 defining a pivot opening 90 therethrough.

Figure 8:
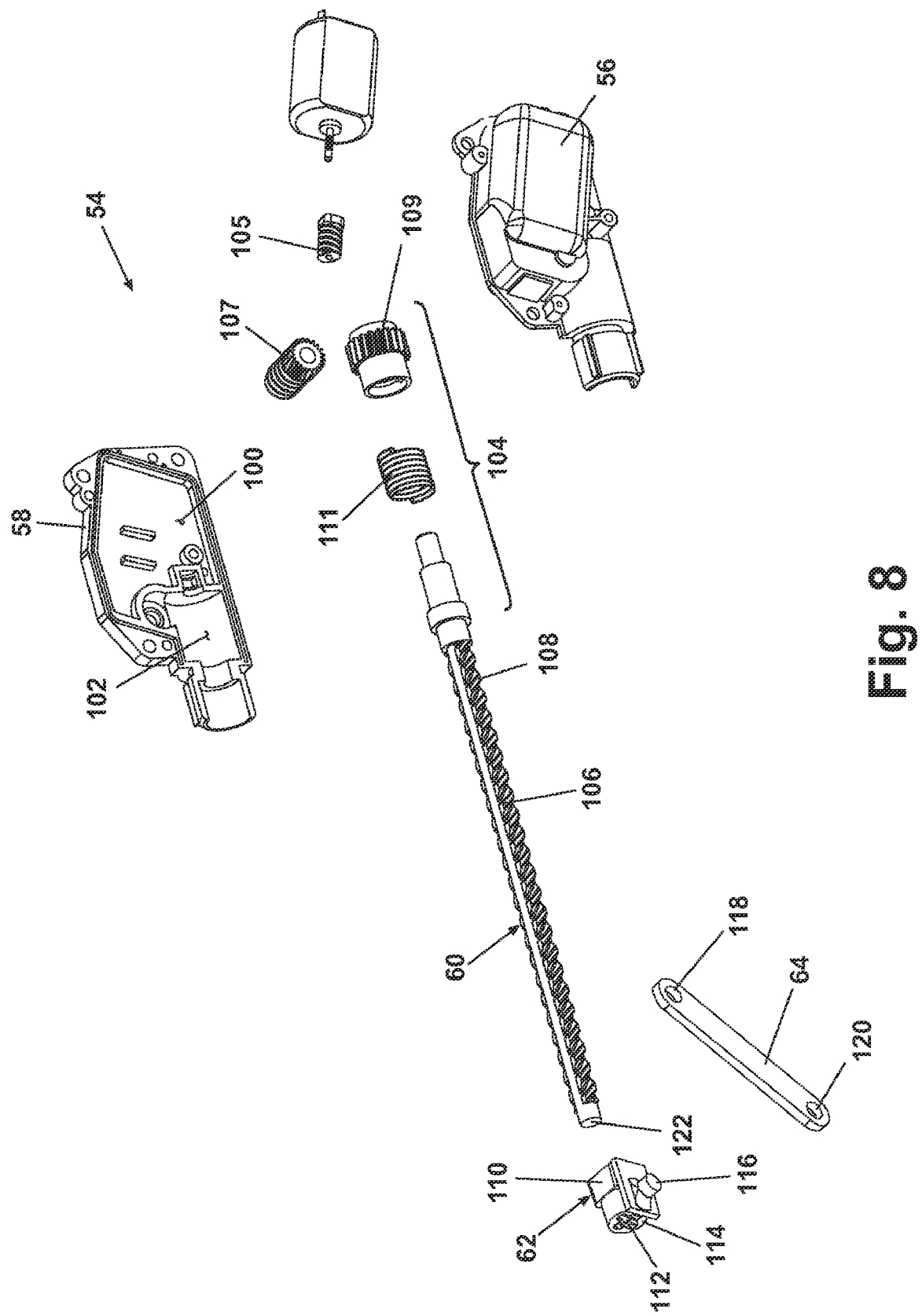
FIG. 8 is an exploded view of a pivot actuator assembly comprising a portion of the vehicular pivot mirror assembly illustrated in FIG. 5.

As illustrated in FIG. 8, the pivot actuator assembly 54 comprises motor/gear housing 55 comprising a pair of cooperatively engaging pivot actuator shells 56, 58 having a motor cavity 100 and a transmission cavity 102 for enclosing a motor and a transmission (neither shown), respectively. An actuator shaft 60 comprises a gear/clutch portion 104 at a first end adapted for operable communication with the transmission for rotation of the actuator shaft 60 with operation of the motor, and a threaded portion 106 extending away from the gear/clutch portion 104 toward a second end terminating in a cylindrical stub shaft 122. The threaded portion 106 is provided with helical threads 108.

An actuator nut 62 is a somewhat prismatic-shaped body comprising a nut housing 110 having a shaft orifice 112 extending longitudinally therethrough provided with threads 114 adapted for threadable engagement with the threaded portion 106 of the actuator shaft 60. Extending radially outwardly from the nut housing 110 is a cylindrical link post 116. As the actuator shaft 60 rotates, the actuator nut 62 will be translated linearly along the actuator shaft 60 in a longitudinal direction dependent upon the direction of rotation of the actuator shaft 60. The structure and operation of the pivot actuator assembly 54 are as generally described further in U.S. patent application Ser. No. 10/906,426, filed Feb. 18, 2005, entitled "Twin-Arm Vehicle Mirror with Power Extend Memory Function" and PCT Patent Application International Application No. PCT/US2004/1942, filed Jun. 17, 2004, entitled "Vehicle Mirror with Powered Extension Incorporating Slip Clutch", which are hereby incorporated by reference as though set forth fully herein.

Preferably, the pitch of the threads 108 and the threads 114 are adapted so that, if sufficient force is applied to the actuator nut 62 longitudinally along the actuator shaft, the actuator shaft 60 will be urged to rotate.

A pivot link 64 is an elongated, generally strap-like member comprising a circular nut orifice 118 extending therethrough at a first end, and a circular pivot frame orifice 120 extending therethrough at a second end. The nut orifice 118 is adapted for slidable communication with the link post 116.

Figure 9A:
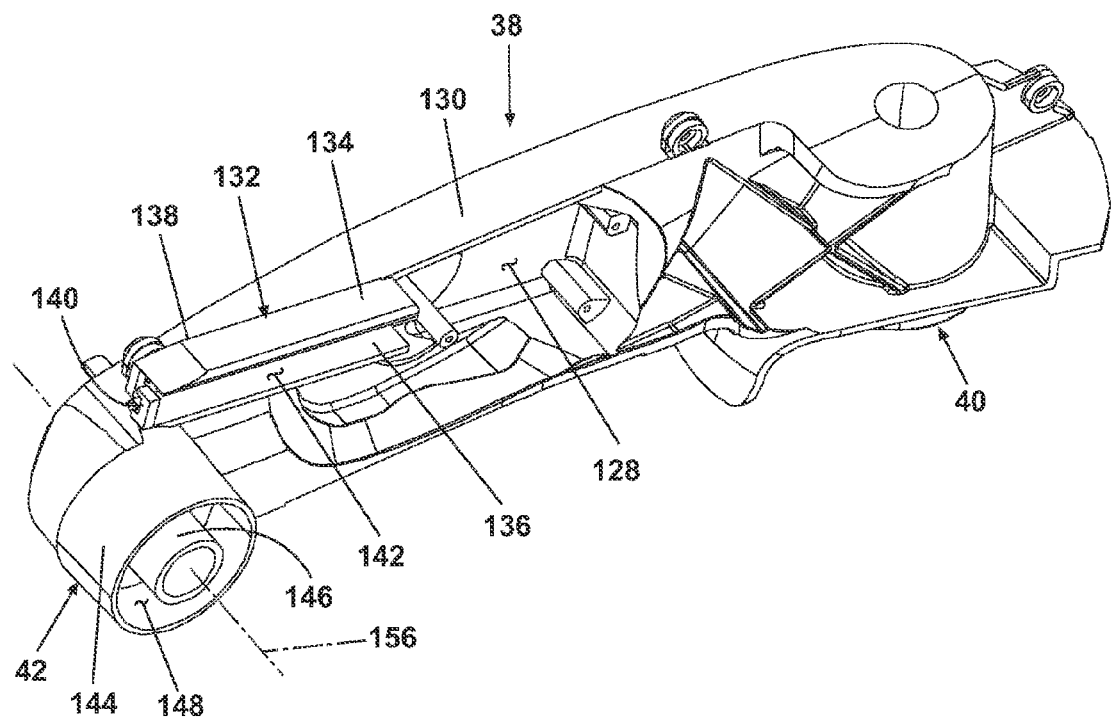
FIGS. 9A-B are perspective views of a support arm frame comprising a portion of the vehicular pivot mirror assembly illustrated in FIG. 5.
Figure 9B:
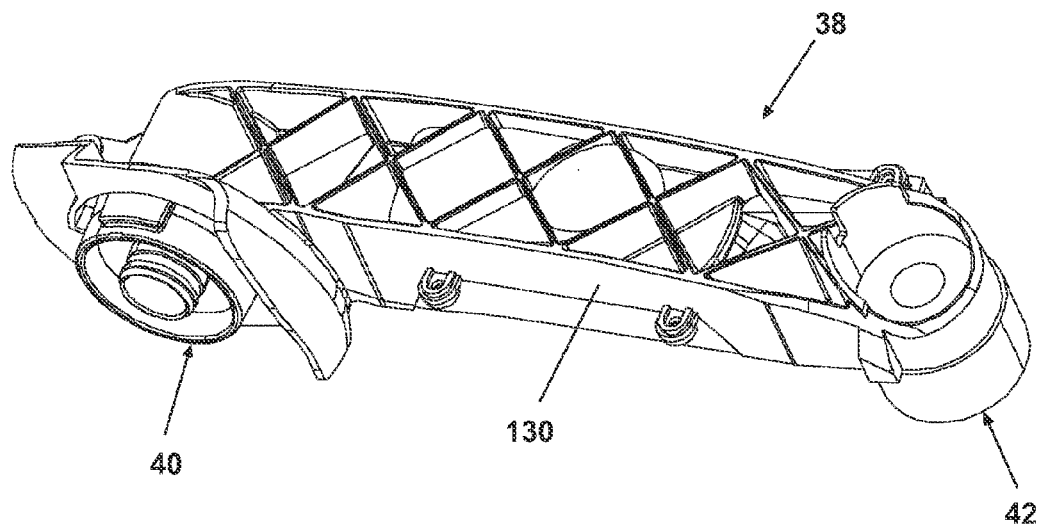

The support arm frame 38 is illustrated in FIGS. 9A-B. The support arm frame 38 is an elongated, irregularly-shaped member comprising a mirror fold bearing sleeve 40 at a first end and a pivot bearing sleeve 42 at an opposed, second end. The mirror fold bearing sleeve 40 is adapted for rotational communication with the mirror fold pedestal assembly 74 for selective movement of the support arm 14 alternately against and away from the motor vehicle. A bridge portion 130 extends between the mirror fold bearing sleeve 40 and the pivot bearing sleeve 42. An elongated, rectilinear nut housing 132 extends from the bridge portion 130 to the pivot bearing sleeve 42, and comprises a top wall 134 and a bottom wall 136 in parallel juxtaposition, joined by a side wall 138, to define a nut channel 142. The nut housing 132 terminates in a shaft end bearing 140 adjacent the pivot bearing sleeve 42 adapted for slidable receipt of the stub shaft 122 therein. The nut housing 132 is adapted for slidable receipt of the actuator nut 62 therein, with the link post 116 extending away from the sidewall 138.

The approximate midpoint of the bridge portion 130 is provided with an actuator chamber 128 adapted to fixedly enclose the pivot actuator assembly 54 so that the actuator shaft 60 with the actuator nut 62 threaded thereon extends through the nut channel 142 with the stub shaft 122 journaled into the shaft end bearing 140.

The pivot bearing sleeve 42 comprises an annular outer wall 144 and an annular inner wall 146 separated by an annulus 148. The outer wall 144, the inner wall 146, and the annulus 148 are coaxial about an axis 156 which is generally parallel to the support surface for the motor vehicle when the mirror assembly 10 is operably attached to the motor vehicle.

Figure 10A:
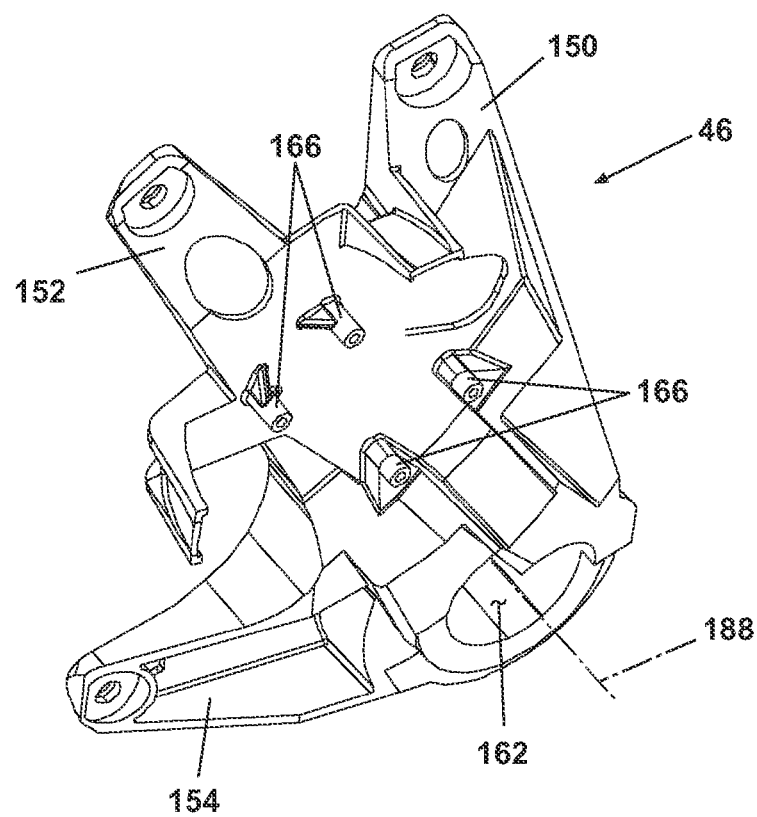
FIGS. 10A-B are perspective views of a pivot frame comprising a portion of the vehicular pivot mirror assembly illustrated in FIG. 5.
Figure 10B:
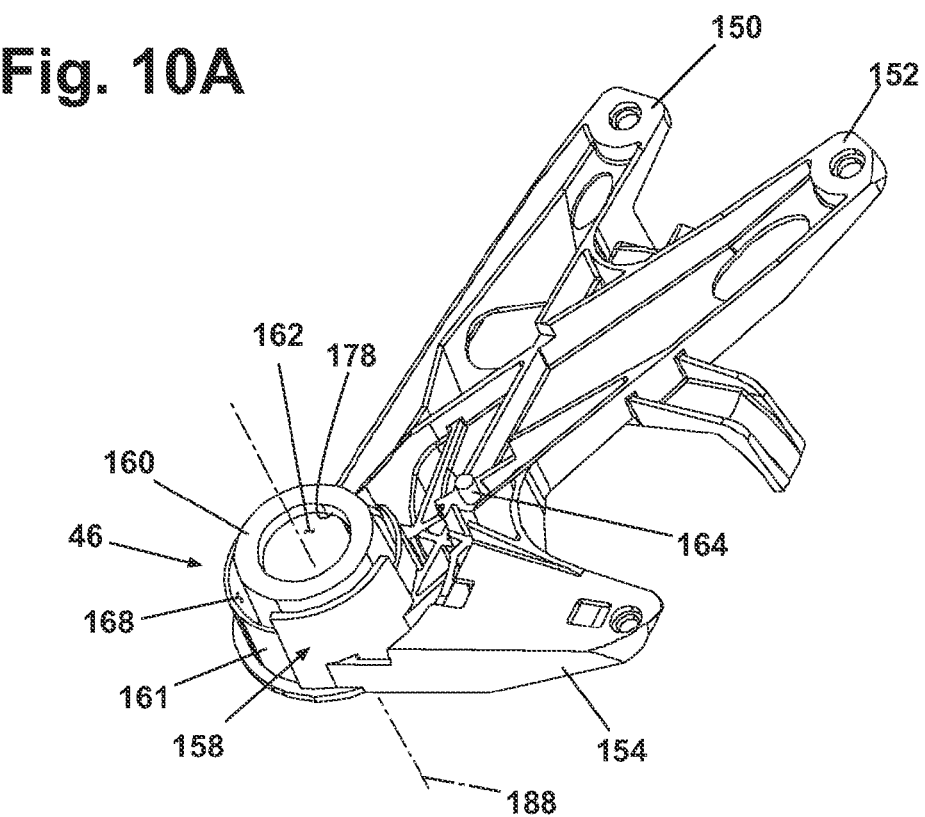

FIGS. 10A-B illustrate the pivot frame 46. The pivot frame 46 is a generally irregularly-shaped body comprising a plurality of mounting arms 150, 152, 154, shown for illustrative purposes as numbering three, extending somewhat radially away from a somewhat cup-like pivot bearing 158. The pivot bearing 158 comprises an inner annular wall 160 and an outer annular wall 161 separated by an annulus 168. The pivot bearing 158 is provided with a circular opening 178 coaxial with the inner annular wall 160 and fluidly communicating with a generally cylindrical chamber 162 defined by the inner annular wall 160. The inner annular wall 160, the outer annular wall 161, the annulus 168, the opening 178, and the chamber 162, are coaxial with an axis 188 extending generally perpendicular to the mounting arms 150, 152, 154. The mounting arms 150, 152, 154 are adapted for attachment to the reflective element assembly cover 26 through suitable fasteners, such as threaded fasteners or rivets, extending through apertures in the ends of the mounting arms 150, 152, 154. The pivot frame 46 is also provided with a plurality of tilt actuator mounting posts 166 for attaching the tilt actuator assembly 48 to the pivot frame 46.

Figure 11:
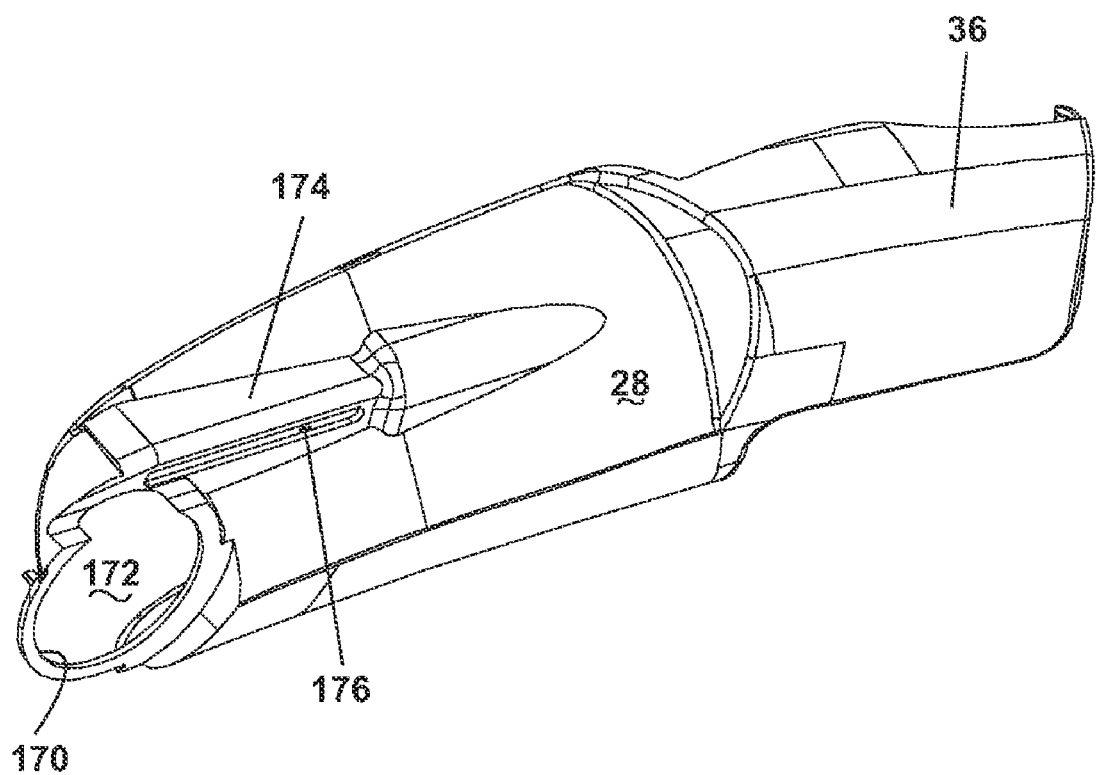
FIG. 11 is a perspective view of a portion of a support arm shell comprising a portion of the vehicular pivot mirror assembly illustrated in FIG. 5.

Referring now to FIG. 11, the rear support arm shell 36 is an elongated member adapted for partial enclosure of the support arm frame 38. The rear support arm shell 36 terminates in a pivot ring 170 at a first end thereof defining a pivot opening 172 adapted for cooperative register with the pivot opening 90 of the reflective element assembly cover 26 to enable slidable relative rotation of the pivot ring 170 with the pivot housing 32. Extending tangentially away from the pivot ring 170 is an elongated pivot actuator housing 174 having a slot 176 extending longitudinally therealong. The pivot actuator housing 174 is adapted for cooperative register with the nut housing 132 so that the link post 116 can extend through the slot 176 and translate along the slot 176 as the actuator nut 62 translates along the nut channel 142.

The rear support arm shell 36 is also adapted with an elongated recess 28 adapted for cooperative register with the recess 30 in the reflective element assembly cover 26 when the reflective element assembly cover 26 is rotated toward the support arm 14.

Referring again to FIG. 5, an annular inner bearing sleeve 66 is illustrated comprising an annular bearing sleeve wall 180 transitioning at one end to an annular bearing sleeve flange 182 extending circumferentially outwardly from the sleeve wall 180. An annular outer bearing sleeve 68 is illustrated comprising an annular bearing sleeve wall 184 transitioning at one end to an annular bearing sleeve flange 186 extending circumferentially outwardly from the sleeve wall 184. The bearing sleeves 66, 68 are preferably fabricated of an extremely low friction material enabling relatively unimpeded relative rotation of the sleeves 66, 68.

Figure 14:
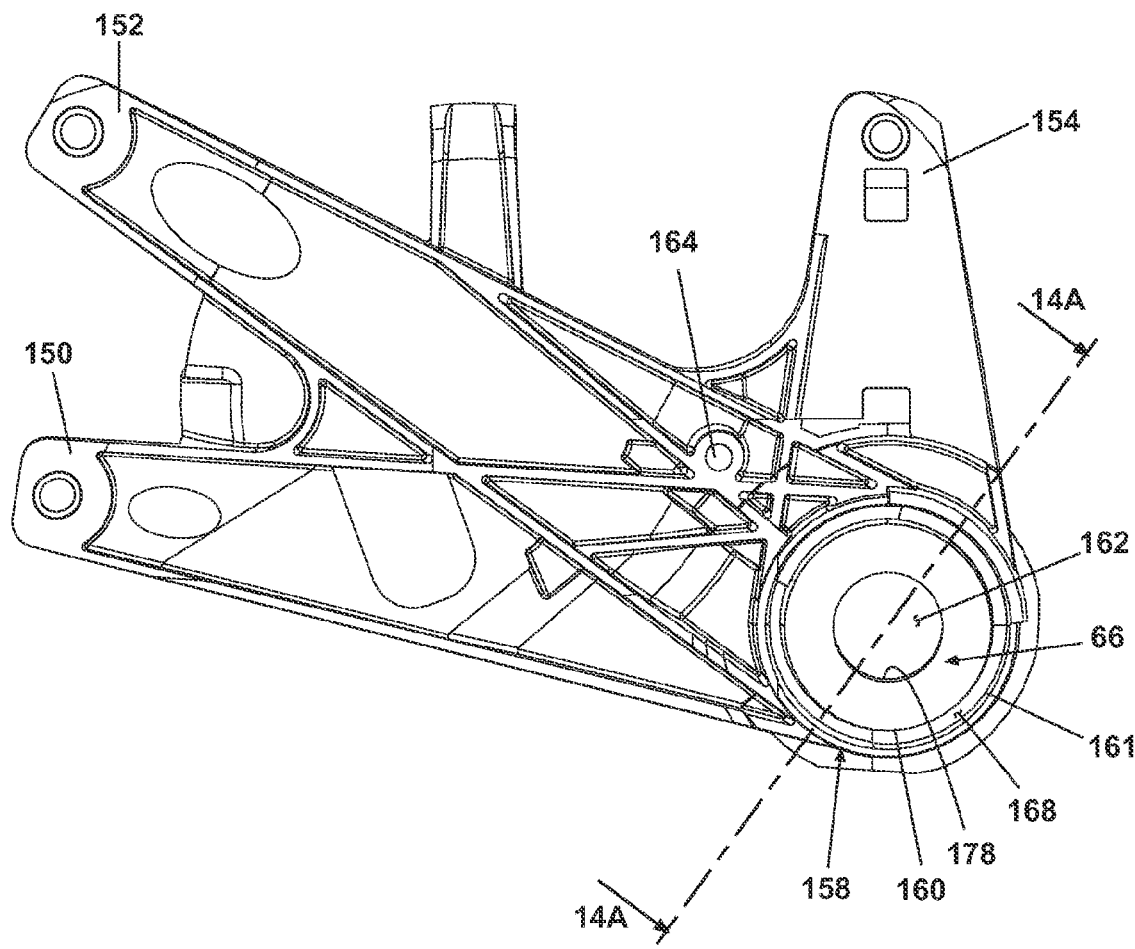
FIG. 14 is a front elevation view of the pivot frame illustrated in FIGS. 10A-B illustrating the assembly of pivot bearing components comprising a portion of the vehicular pivot mirror assembly.

As illustrated in FIGS. 5 and 14, the inner bearing sleeve 66 is received in the pivot bearing sleeve 42 of the support arm frame 38 in slidable registry with the inner wall 146, with the bearing sleeve flange 182 oriented toward the interior of the pivot bearing sleeve 42. The outer bearing sleeve 68 is slidably received over the inner bearing sleeve 66 with the bearing sleeve flange 186 oriented away from the support arm frame 38. A retainer, such as a press-fit ring or push nut 70, is frictionally received over the inner wall 146 to retain the sleeves 66, 68 over the inner wall 146 in the pivot bearing sleeve 42.

Figure 14A:
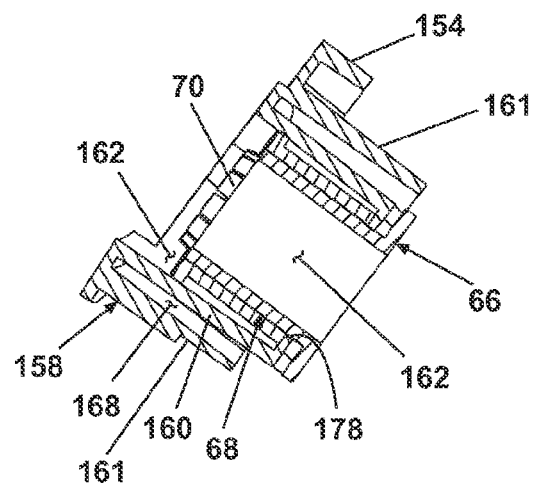
FIG. 14A is a sectional view taken along view line 14A-14A of FIG. 14.
Figures 15, 15A:
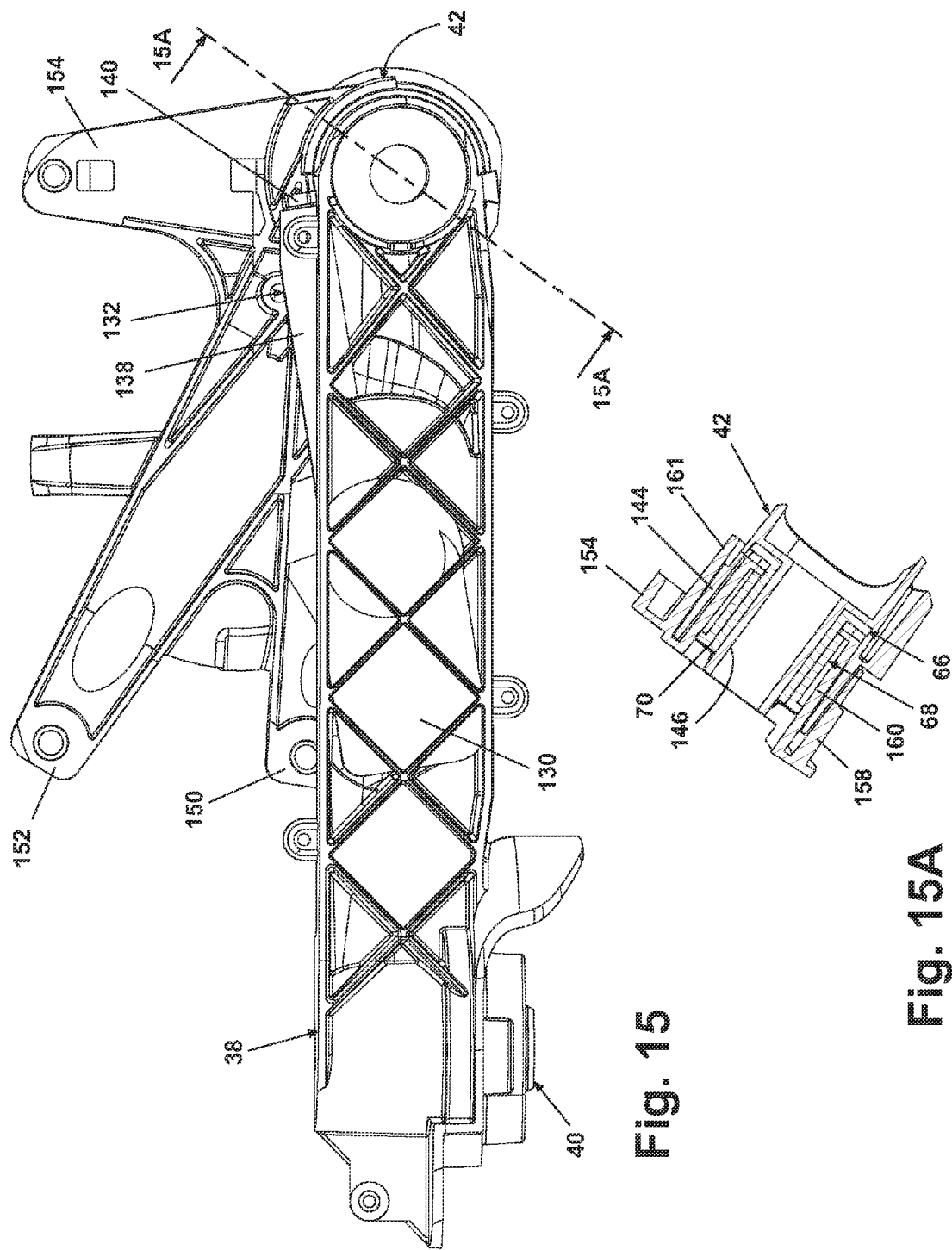
FIG. 15 is a front elevation view of the pivot frame illustrated in FIGS. 10A-B connected to the support arm frame illustrated in FIGS. 9A-B.
FIG. 15A is a sectional view taken along view line 15A-15A of FIG. 15.
Figure 16:
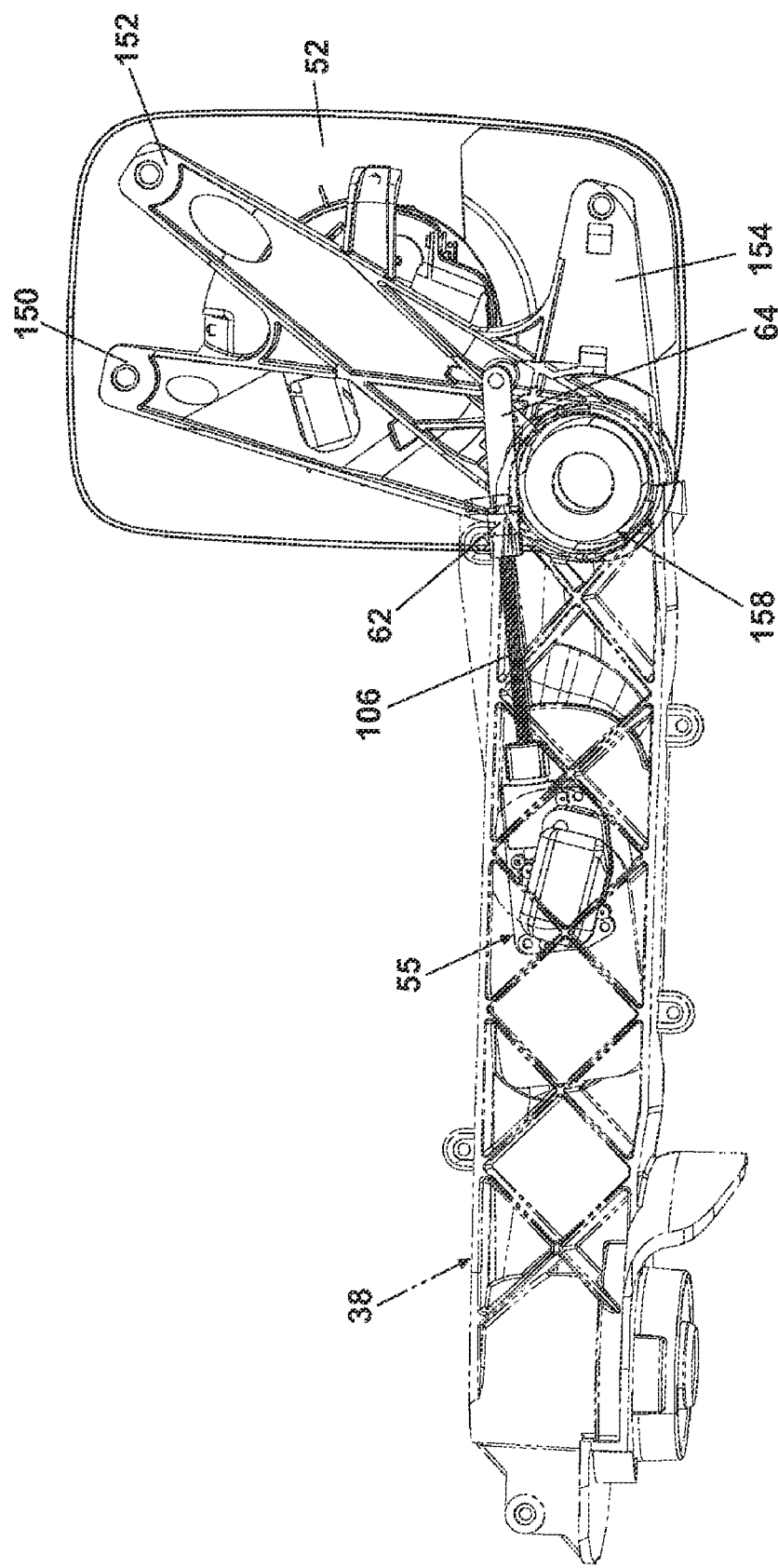
FIG. 16 is a front elevation view of the assembled vehicular pivot mirror assembly illustrated in FIG. 12 in a second, outboard position.

Referring now to FIGS. 15 and 16, the nested relationship of the bearing sleeves 66, 68 with the pivot frame 46 and the support arm frame 38 is illustrated. The outer bearing sleeve 68 is inserted into the chamber 162 in the pivot frame 46 so that the bearing sleeve flange 186 extends away from the opening 178. As shown in FIG. 14A, the chamber 162 is adapted for slidable communication with the bearing sleeve flange 186. The inner bearing sleeve 66 is inserted through the opening 178 so that the bearing sleeve wall 180 of the inner bearing sleeve 66 is in slidable communication with the bearing sleeve wall 184 of the outer bearing sleeve 68. The bearing sleeve flange 182 will be in communication with the inner annular wall 160. Referring also to FIG. 15A, the pivot bearing sleeve 42 of the support arm frame 38 is brought into operable communication with the pivot bearing 158 of the pivot frame 46 so that the inner wall 146 is in slidable communication with the bearing sleeve wall 180, the outer wall 144 is received within the annulus 168, and the inner annular wall 160 is received within the annulus 148. A retainer, such as a press-fit ring or push nut 70, is installed over the inner wall 146 and is adapted to bear against the bearing sleeve flange 186 and the inner bearing sleeve wall 180 to pivotably secure the pivot frame 46 to the support arm frame 38.

Figure 12:
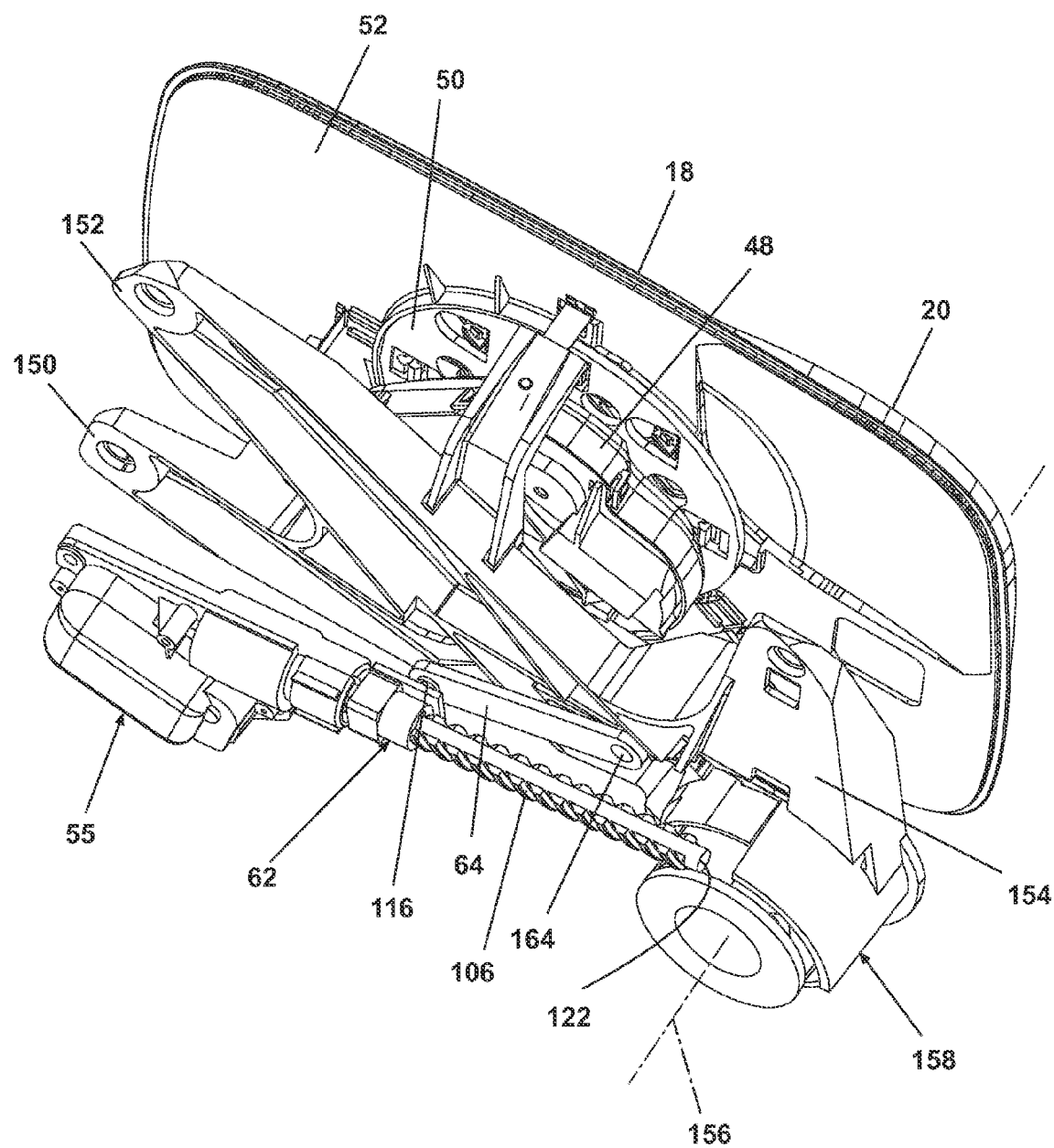
FIG. 12 is a perspective view of the assembled vehicular pivot mirror assembly illustrated in FIG. 5 with parts removed for clarity.

FIG. 12 illustrates the pivot actuator assembly 54 and the pivot frame 46 in relative assembled position, with portions of the pivot rear assembly 10, including the support arm frame 38 removed for clarity. As illustrated in FIG. 12, the pivot link 64 interconnects the actuator nut 62 and the pivot frame 46 when the link post 116 is inserted into the nut orifice 118 and the link pin 164 is inserted into the pivot frame orifice 120. As the actuator nut 62 travels longitudinally along the threaded portion 106 of the actuator shaft 60, the pivot link 64 will be translated to the right (as viewed in FIGS. 12 and 13), thereby urging the pivot frame 46 into rotation about an axis 156 passing coaxially through the pivot bearing 158.

Figure 13:
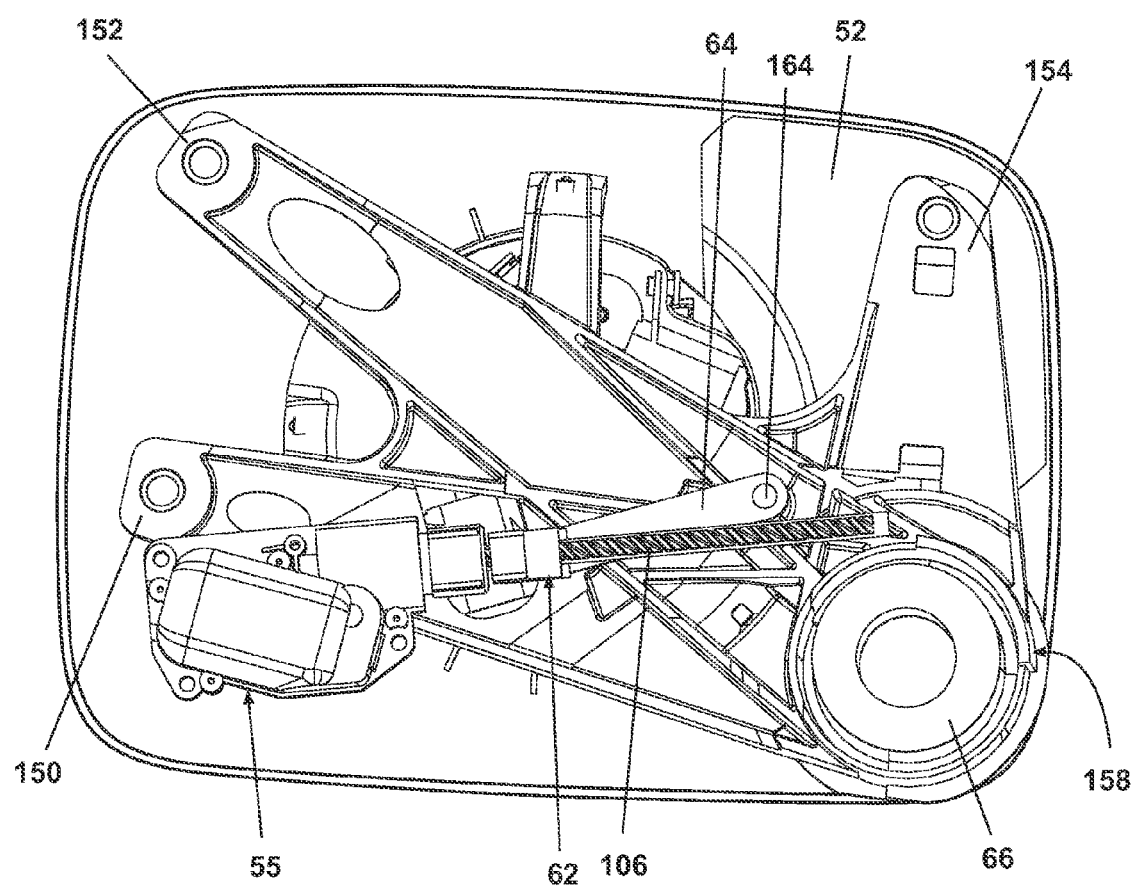
FIG. 13 is a front elevation view of the assembled vehicular pivot mirror assembly illustrated in FIG. 12 in a first, inboard position.

As illustrated in FIGS. 12 and 13, with the actuator nut 62 adjacent the pivot actuator shell 56, 58, the reflective element assembly 16 will be in an inboard position, as illustrated in FIGS. 1 and 2. As illustrated in FIG. 16, with the actuator nut 62 adjacent the stub shaft 122, the reflective element assembly 16 will be in an outboard position, as illustrated in FIGS. 3 and 4.

The first embodiment of the vehicular pivot mirror assembly 10 has been illustrated and described as incorporating a power-driven pivot actuator assembly 54 comprising an electric motor and a transmission which operates, through the pivot link 64, to rotate the reflective element assembly 16 between an inboard position and an outboard position. The pivot actuator assembly 54 described herein enables the reflective element assembly 16 to be manually pivoted between the inboard and outboard positions due to the configuration of the threads 108, 114 and the clutch assembly. All other elements of the pivot mirror assembly 10 remain the same.

Figure 17:
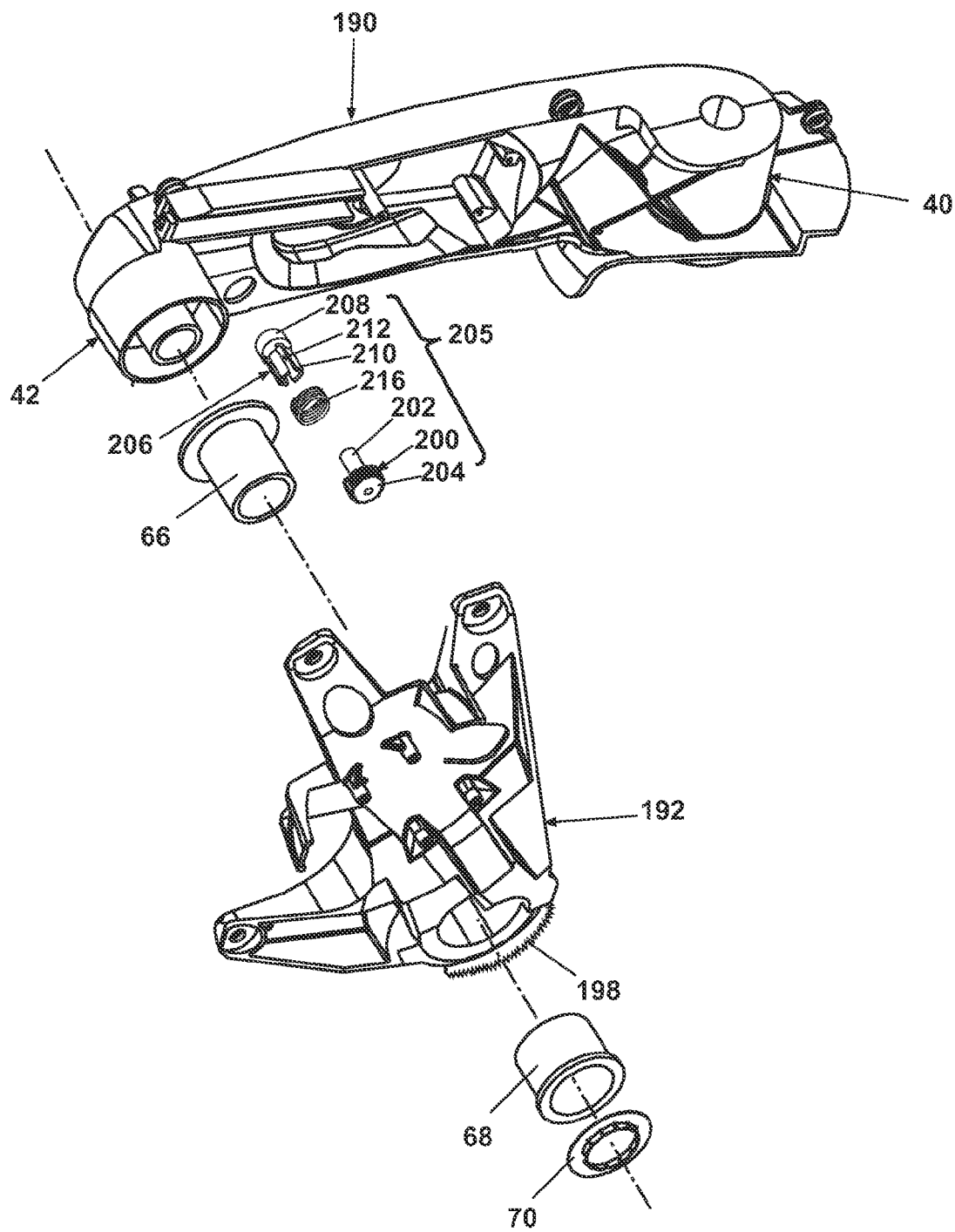
FIG. 17 is an exploded view of a portion of the vehicular pivot mirror assembly illustrated in FIG. 1 showing a second embodiment thereof.
Figure 18:
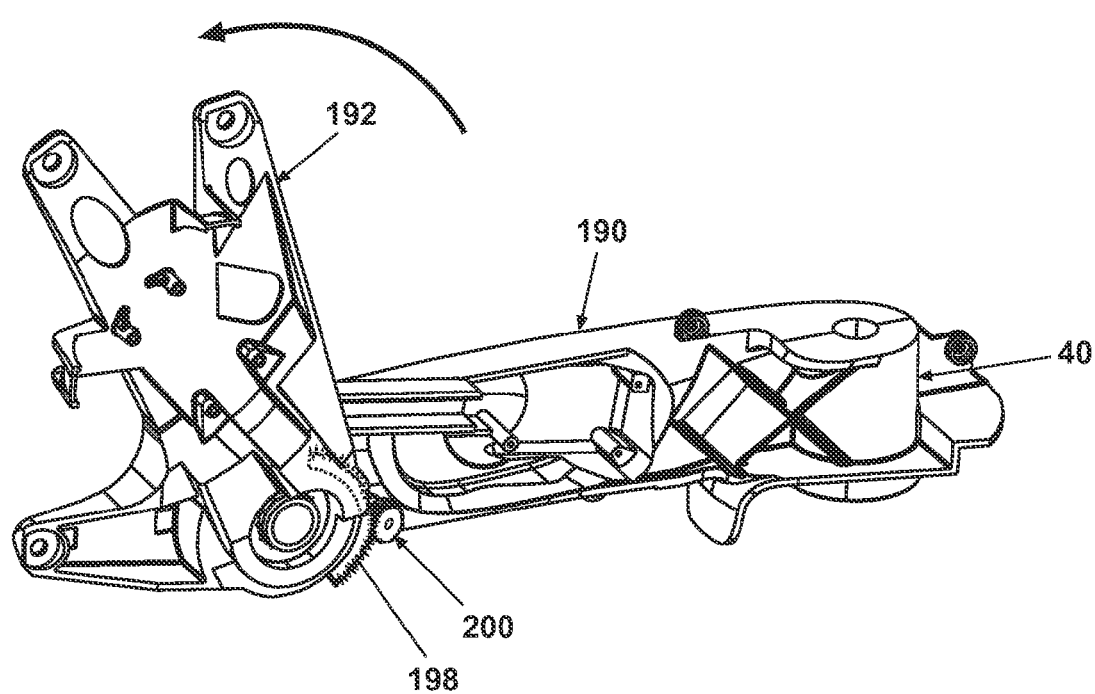
FIG. 18 is a perspective view of the assembled portion of the vehicular pivot mirror assembly illustrated in FIG. 17 in a first, outboard position.
Figure 19:
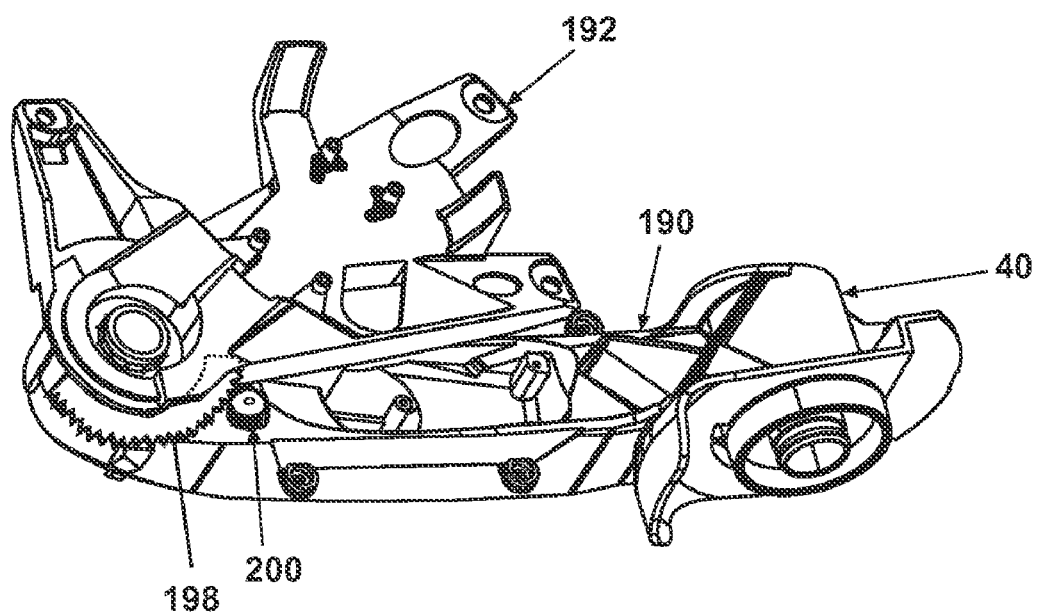
FIG. 19 is a perspective view of the assembled portion of the vehicular pivot mirror assembly illustrated in FIG. 17 in a second, inboard position.

FIGS. 17-19 illustrate a second embodiment of the pivot mirror assembly for manual pivoting of the reflective element assembly 16 comprising an alternate positioning assembly. A support arm frame 190 is identical to the support arm frame 38 with the addition of a chamber 196 in the support arm frame 190 adjacent the pivot bearing sleeve 42. A circular opening 194 is provided into the chamber 196. A pivot frame 192 is identical to the pivot frame 46 with the addition of an arcuate toothed rack 198 extending partially along the outer circumference of the pivot bearing sleeve 42. The pivot actuator assembly 54 is omitted in this embodiment.

A clutch assembly 205 comprises a clutch cylinder 206 and a pinion 200. The pinion 200 is a somewhat T-shaped body having a smooth cylindrical shaft 202 transitioning coaxially at a first end to a circular toothed portion 204. The clutch cylinder 206 is a generally annular body having a shaft aperture 214 extending axially therethrough and adapted for slidable communication with the shaft 202. The clutch cylinder 206 comprises an annular base 208 and a plurality of coaxially-oriented elongated fingers 210 extending longitudinally therefrom, having an arcuate cross-section. The fingers 210 are separated by elongated slots 212 which enable the fingers 210 to freely deflect inwardly. A helical spring 216 is adapted to be retained circumferentially around the fingers 210 to impart an inward compressive force on the fingers 210. When the shaft 202 is received in the shaft aperture 214, the spring 216 will impart a force urging the fingers 210 into frictional communication with the shaft 202.

The magnitude of the force can be adjusted by adjusting the compressive force exerted by the spring 216. The pinion 200 will be prevented from moving relative to the clutch cylinder 206 as a result of the frictional force between the fingers 210 and the shaft 202. However, if sufficient rotational force is applied to the pinion 200 to overcome the frictional force between the fingers 210 and the shaft 202, the pinion 200 will rotate relative to the clutch cylinder 206.

The clutch assembly 205 is received within the chamber 196 with the clutch cylinder 206 fixedly retained in the chamber 196 to prevent rotation of the clutch cylinder 206 relative to the support arm frame 190. The pinion 200 extends from the clutch cylinder 206 through the opening 194 for toothed engagement with the rack 198. As so assembled, the pinion 200 will be held against rotation relative to the clutch cylinder 216, thereby maintaining the reflective element assembly 16 in a preselected position. With sufficient pivoting force applied to the reflective element assembly 16 to rotate the reflective element assembly 16 relative to the support arm frame 190, the frictional force between the clutch cylinder 206 and the pinion 200 will be overcome and the reflective element assembly 16 will be repositioned.

Figure 20:
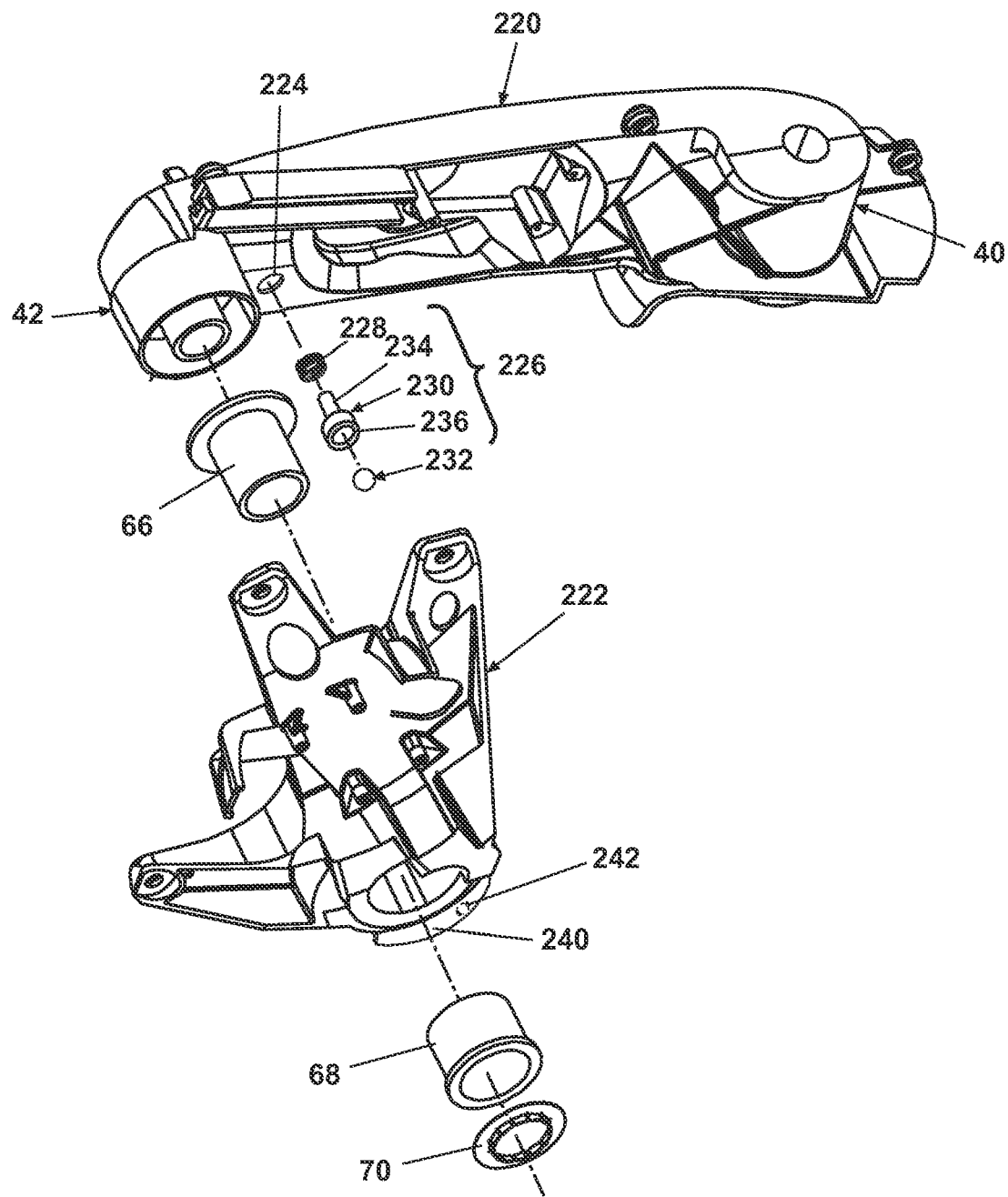
FIG. 20 is an exploded view of a portion of the vehicular pivot mirror assembly illustrated in FIG. 1 showing a third embodiment thereof.
Figure 21:
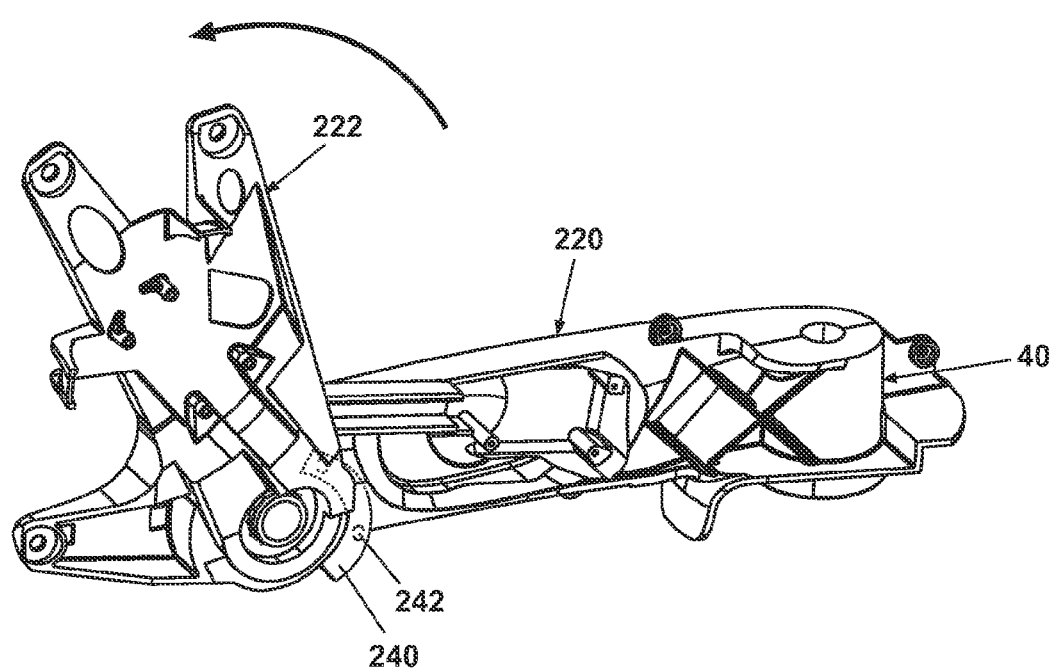
FIG. 21 is a perspective view of the assembled portion of the vehicular pivot mirror assembly illustrated in FIG. 20 in a first, outboard position.
Figure 22:
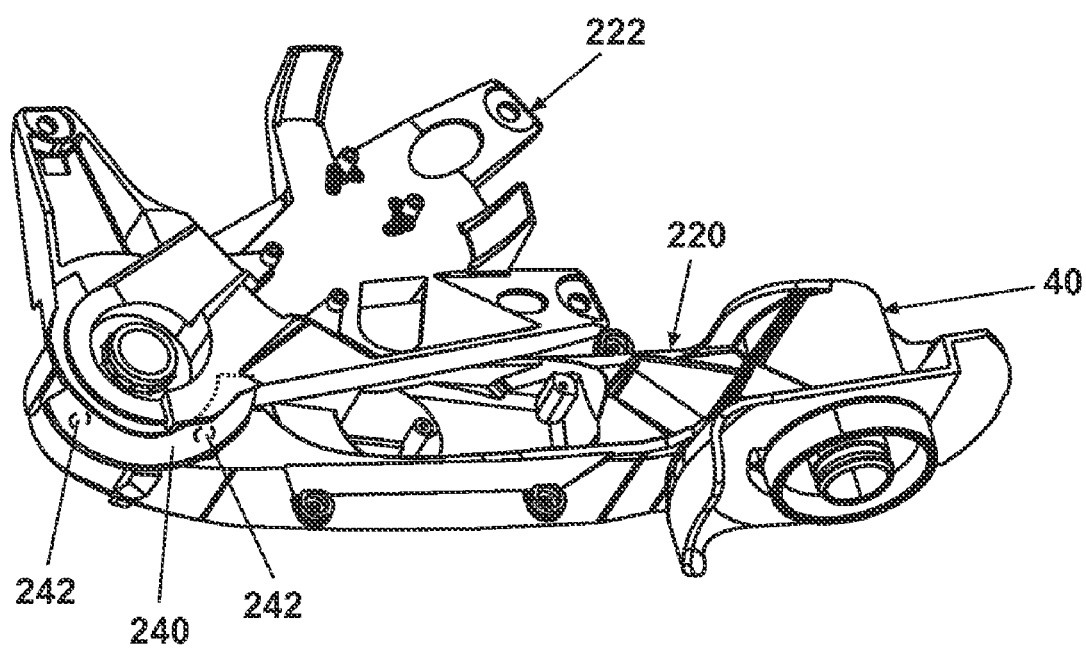
FIG. 22 is a perspective view of the assembled portion of the vehicular pivot mirror assembly illustrated in FIG. 20 in a second, inboard position.
Figure 23:
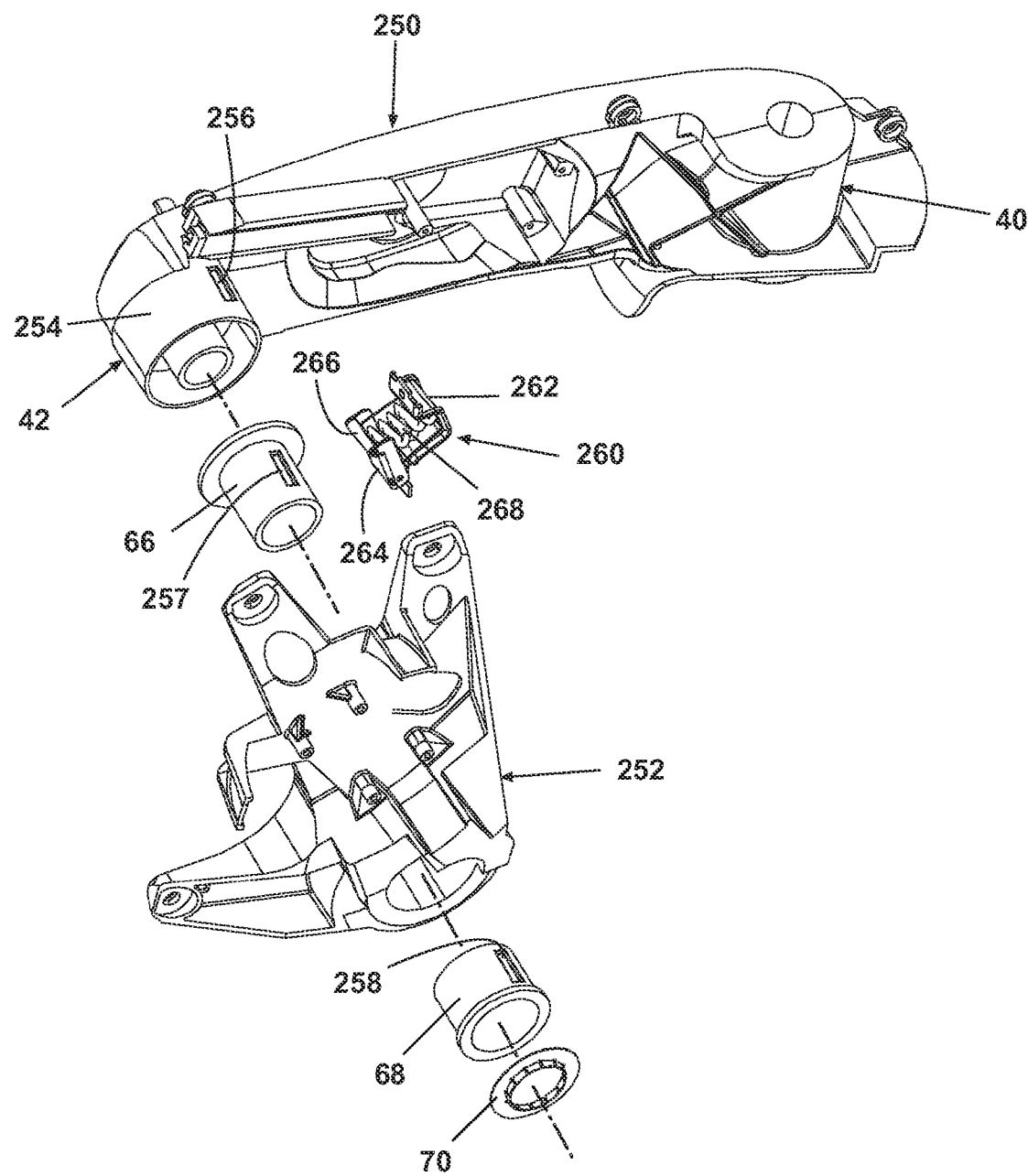
FIG. 23 is an exploded view of a portion of the vehicular pivot mirror assembly illustrated in FIG. 1 showing a fourth embodiment thereof.

FIGS. 20-22 illustrate a third embodiment of the pivot mirror assembly for manual pivoting of the reflective element assembly 16 comprising yet another alternate positioning assembly. A support arm frame 220 is identical to the support arm frame 38 with the addition of a stop pin chamber 224 in the support arm frame 220 adjacent the pivot bearing sleeve 42. A pivot frame 222 is identical to the pivot frame 46 with the addition of an arcuate flange 240 extending partially along the outer circumference of the pivot bearing sleeve 42. The pivot actuator assembly 54 is omitted in this embodiment.

A stop pin assembly 226 is adapted for slidable insertion into the stop pin receptacle 224, and comprises a spring 228 and a stop pin 230. The stop pin 230 comprises a cylindrical shaft 232 transitioning coaxially at a first end to a circular housing 236 having a semi-spherical receptacle 238 in opposed coaxial juxtaposition with the shaft 232. The spring 228 is adapted for slidable receipt over the shaft 232 and communication with the housing 236. A sphere 232 is adapted for rotational seating in the receptacle 238 for rotation of the sphere 232 relative to the housing 236.

The arcuate flange 240 is provided with a stop 242 adapted for seating of the sphere 232 therein. The stop pin assembly 226 is received in the stop pin chamber 224 with the spring 228 bearing against the housing 236 to urge the stop pin assembly 226 away from the stop pin chamber 224. As so assembled, the sphere 232 will be urged into contact with the arcuate flange 240, thereby applying a force tending to restrict rotation of the pivot frame 222 relative to the support arm frame 220. Rotation of the sphere 232 will enable the pivot frame 222 to be rotated relative to the support arm frame 220. However, the force of the sphere 232 against the art to a flange 240 can be adjusted based upon the force exerted by the spring 228 against the housing 236. Precise positioning of the pivot frame 222 relative to the support arm frame 220 can be provided by seating the sphere 232 in the stop 242. The reflective element assembly 16 can be positioned in an outboard configuration (FIG. 21) or an inboard configuration (FIG. 22.)

FIGS. 23-27 illustrate a fourth embodiment of the pivot mirror assembly for manual pivoting of the reflective element assembly 16 comprising yet another alternate positioning assembly. A support arm frame 250 is identical to the support arm frame 38 with the addition of a mounting surface 280 in the support arm frame 250 adjacent the pivot bearing sleeve 42 for mounting of a detent assembly 260, as hereinafter described. A pivot frame 252 is identical to the pivot frame 46 with the addition of at least one elongated detent 256 extending longitudinally along a portion of an outer annular wall 254 comprising part of the pivot bearing sleeve 42. The pivot actuator assembly 54 is omitted in this embodiment.

The detent assembly 260 is a spring-biased pivoting mechanism comprising a somewhat U-shaped spring frame 262 adapted for mounting a spring 268 therein. A pivot arm 264 is pivotally attached at a first end to the spring frame 262 and adapted for cooperative register with the spring 268 for pivotally biasing a second end of the pivot arm 264 away from the spring frame 260. The second end of the pivot arm 264 mounts a roller 266 having a longitudinal axis transverse to a longitudinal axis of the pivot arm 264 and positioned somewhat away from the pivot arm 264. The spring frame 262 is provided with suitable flanges, fastener apertures, and mounting bosses for attaching the detent assembly 260 to the support arm frame 250 in a suitable orientation.

Figure 26:
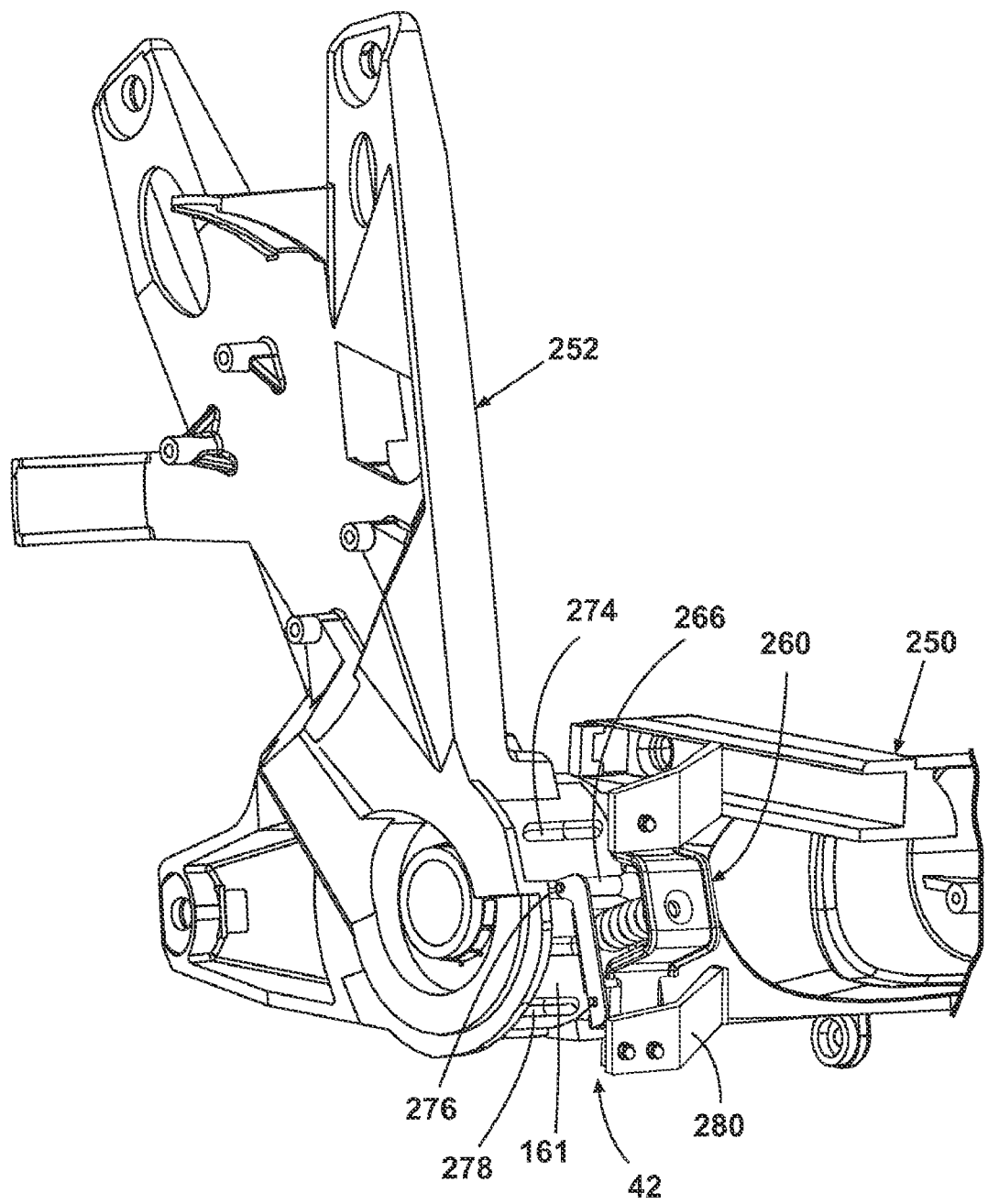

As illustrated in FIG. 26, the detent assembly 260 will be oriented so that the roller 266 bears against the outer annular wall 161 of the pivot frame 252. A plurality of elongated detents, such as the detents 274, 276, 278 having a size complementary to the circumference of the roller 266 are located in the outer annular wall 161 corresponding to inboard, intermediate, and outboard positions of the pivot frame 252. Slots 257, 258 (shown in FIG. 23 for illustrative purposes) can be provided in the inner bearing sleeve 66 and/or the outer bearing sleeve 68 to facilitate the roller 266 engaging the outer annular wall 161.

As the pivot frame 252 is manually urged between an outboard position (FIGS. 24 and 26) and an inboard position (FIG. 25), the roller 266 will alternately engage one or more corresponding detents 274, 276, 278 in the outer annular wall 161. The spring 268 will bias the roller 266 into the detents, and can be selected based upon a desired spring force. The use of the roller 266 will facilitate the movement of the pivot frame 252 between the inboard and outboard positions.

Figure 27:
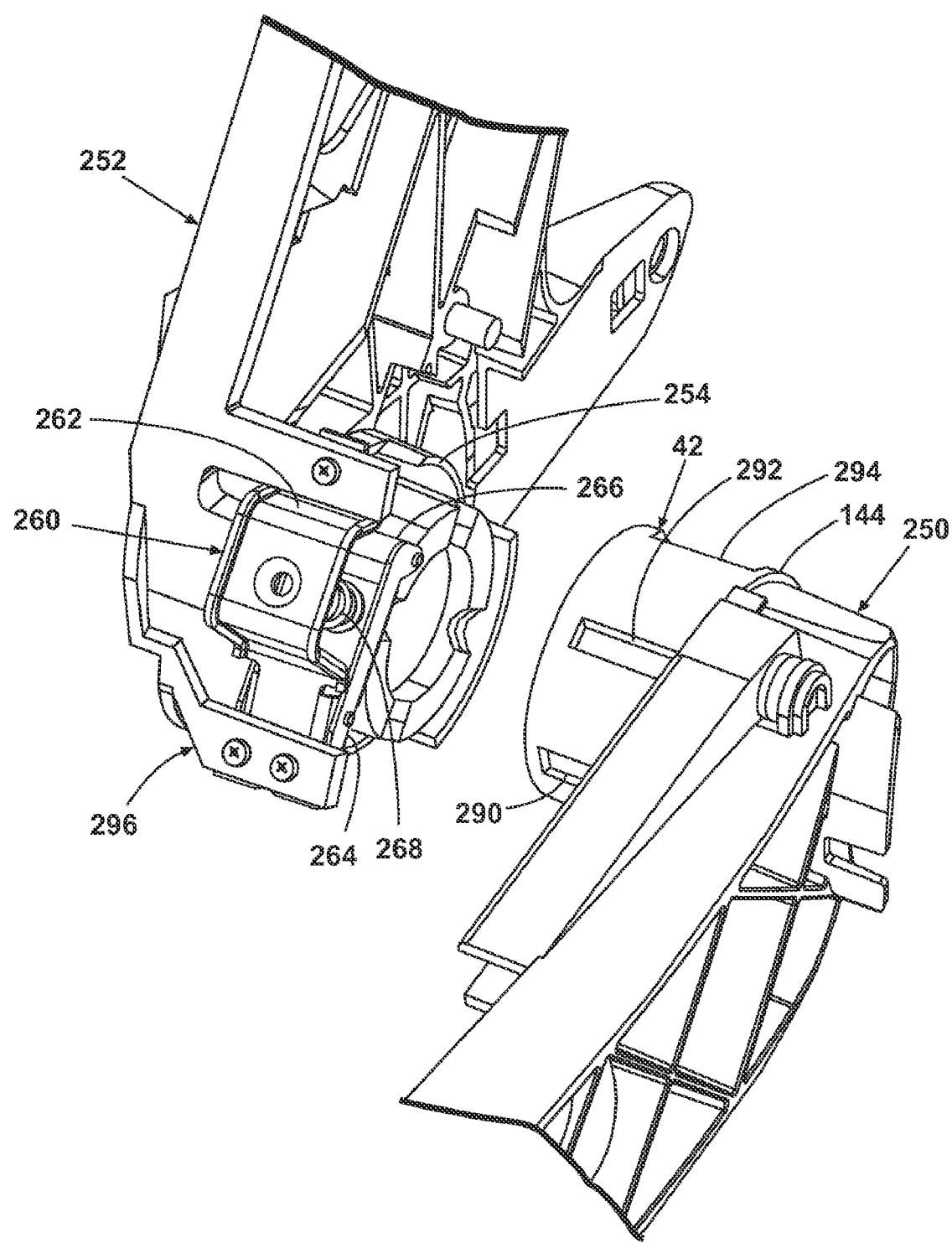

The location of the detent assembly 260 and the detents can be switched so that the detent assembly 260 is mounted, not on the support arm frame 250, but on the pivot frame 252, which is part of the reflective element assembly, and the detents are incorporated into the pivot bearing sleeve 42, which is part of the support arm frame, rather than the outer annular wall 161. FIG. 27 illustrates this configuration, and shows the detent assembly 260 mounted on the pivot frame 252 by a suitable mounting bracket 296. The pivot bearing sleeve 42 incorporates a plurality of detents, such as the detents 290, 292, 294, corresponding to inboard, intermediate, and outboard positions of the pivot frame 252. The operation of the detent assembly 260 in this configuration is generally the same as for the configuration illustrated in FIGS. 23-26.

Figure 24:
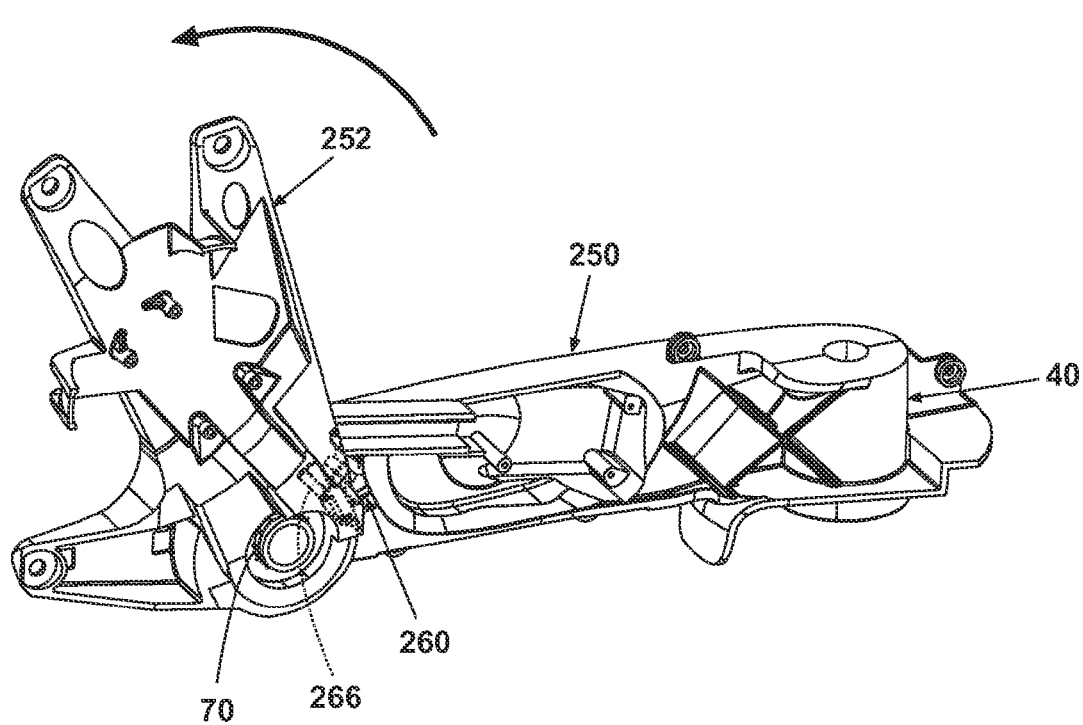
FIG. 24 is a perspective view of the assembled portion of the vehicular pivot mirror assembly illustrated in FIG. 23 in a first, outboard position.
Figure 25:
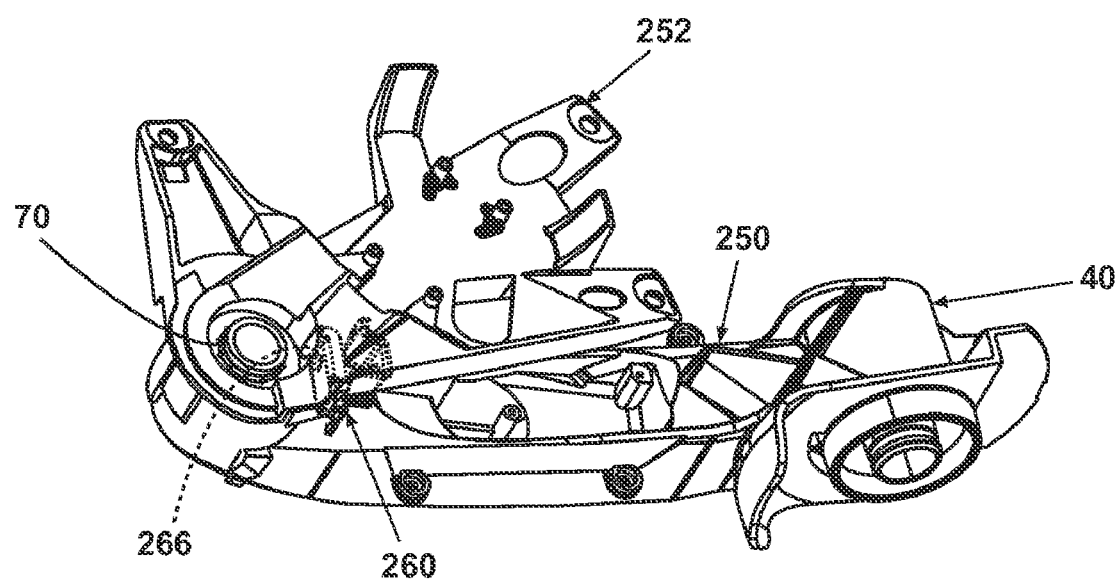
FIGS. 25-27 are perspective views of the assembled portion of the vehicular pivot mirror assembly illustrated in FIG. 23 in a second, inboard position.

FIG. 27 illustrates a variation of the embodiment illustrated in FIGS. 24-26 in which the detent assembly 260 is mounted to the pivot frame 252, and at least one elongated detent 256 is formed in the outer wall 144 of the support arm frame 250. A portion of the wall 254 is omitted adjacent the roller 266 so that the roller 266 can engage the detent 256 in the outer wall 144. The detent assembly 260 is oriented on the pivot frame 252 so that the roller 266 can extend into the detent 256, and can bear against the outer wall 144 of the support arm frame 250 as the pivot frame 252 is rotated relative to the support arm frame 250. Additional elongated detents (257, 258) are located along the outer wall 144, in a manner similar to the configuration of the embodiment illustrated in FIGS. 24-26, corresponding to the inboard and outboard positions of the pivot frame 252, and selected intermediate positions.

The vehicular pivot mirror assembly 10 described herein is an improvement over the prior art in that bearing surfaces between the pivot frame and the support arm frame remain planar. Wear between the bearing surfaces is reduced, and the connection of the pivot frame to the support arm frame remains unchanged overtime. Consequently, vibration of the reflective element assembly is reduced. Furthermore, the vehicular pivot mirror assembly 10 can be operated as either a manual mirror or a power-driven mirror with the addition of a well known electrical motor drive assembly.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A vehicular mirror assembly, comprising:
   a reflective element assembly;
   a support arm for supporting the reflective element assembly;
   a pivot connection connecting the reflective element assembly to the support arm and enabling the reflective element assembly to be rotated between a first position and a second position relative to the support arm, the pivot connection including a retainer which prevents axial movement of the reflective element assembly relative to the support arm; and
   a clutch assembly interposed between the reflective element assembly and the support arm comprising a threaded shaft associated with one of the reflective element assembly and the support arm, and a follower nut received on the threaded shaft and associated with the other of the reflective element assembly and the support arm, for maintaining the reflective element assembly in one of the first position and the second position and permitting rotation of the reflective element assembly relative to the support arm between the first and second positions;

wherein linear movement of the follower nut along the threaded shaft is translated into pivotal movement of the reflective element assembly with respect to the support arm.

2. The vehicular mirror assembly of claim 1 wherein the pivot connection comprises a pair of juxtaposed bearing sleeves associated with a respective one of the support arm and the reflective element assembly.

3. The vehicular mirror assembly of claim 2 wherein the pair of juxtaposed bearing sleeves is made from a low-friction material.

4. The vehicular mirror assembly of claim 3 wherein the retainer comprises a press-fit ring received on one of the support arm and the reflective element assembly and encapsulating the pair of juxtaposed bearing sleeves between the retainer and the other of the support arm and the reflective element assembly.

5. The vehicular mirror assembly of claim 4 wherein the support arm further comprises a stop in register with the other of the first and second positions, wherein the stop defines an end-of-travel position for the reflective element assembly with respect to the support arm.

6. The vehicular mirror assembly of claim 1 and further comprising a motive-producing element connected to the threaded shaft for introducing rotation to the threaded shaft, and causing the nut follower to travel along the threaded shaft.

7. The vehicular mirror assembly of claim 6 wherein the clutch assembly further comprises a slip clutch located between the threaded shaft and the motive-producing element.

8. A vehicular mirror assembly, comprising:

a reflective element assembly;

a support arm for supporting the reflective element assembly comprising a stop defining an end-of-travel position for the reflective element assembly with respect to the support arm;

a pivot connection comprising a pair of juxtaposed bearing sleeves made from a low-friction material and associated with a respective one of the support arm and the reflective element assembly, the pivot connection connecting the reflective element assembly to the support arm and enabling the reflective element assembly to be rotated between a first position and a second position relative to the support arm, the pivot connection including a retainer comprising a press-fit ring received on one of the support arm and the reflective element assembly and encapsulating the pair of juxtaposed bearing sleeves between the retainer and the other of the support arm and the reflective element assembly, which retainer prevents axial movement of the reflective element assembly relative to the support arm; and a clutch assembly interposed between the reflective element assembly and the support arm for maintaining the reflective element assembly in one of the first position and the second position and permitting rotation of the reflective element assembly relative to the support arm between the first and second positions;

wherein the clutch assembly comprises a detent on one of the reflective element assembly and the support arm, offset from an axis of rotation of the reflective element assembly relative to the support arm, and a pivot arm on the other of the reflective element assembly and the support arm, the pivot arm having a roller parallel to the axis of rotation of the reflective element assembly and adapted for engagement with the detent, so that the roller is received by the detent when the support arm is located in one of the first and second positions; and wherein the stop is in register with the other of the first and second positions.

9. A vehicular mirror assembly, comprising:

a reflective element assembly;

a support arm for supporting the reflective element assembly;

a pivot connection connecting the reflective element assembly to the support arm and enabling the reflective element assembly to be rotated between a first position and a second position relative to the support arm, the pivot connection including a retainer which prevents axial movement of the reflective element assembly relative to the support arm; and a clutch assembly interposed between the reflective element assembly and the support arm for maintaining the reflective element assembly in one of the first position and the second position and permitting rotation of the reflective element assembly relative to the support arm between the first and second positions;

wherein the clutch assembly comprises a detent on one of the reflective element assembly and the support arm, offset from an axis of rotation of the reflective element assembly relative to the support arm on one of the reflective element assembly and the support arm, a biased member in register with the detent on the other of the reflective element assembly and the support arm, wherein the biased member is received by the detent when the support arm is located in one of the first and second positions, and a pivot arm on the other of the reflective element assembly and the support arm, the pivot arm having a roller parallel to the axis of rotation of the reflective element assembly and adapted for engagement with the detent, so that the roller is received by the detent when the support arm is located in one of the first and second positions.

10. The vehicular mirror assembly of claim 9 wherein the support arm further comprises a stop in register with the other of the first and second positions, wherein the stop defines an end of travel position for the reflective element assembly with respect to the support arm.

11. The vehicular mirror assembly of claim 9 wherein the biased member comprises the pivot arm.

12. The vehicular mirror assembly of claim 11 wherein the biased member further comprises a spring for biasing the roller into the detent.

* * * * *